Figure 1:
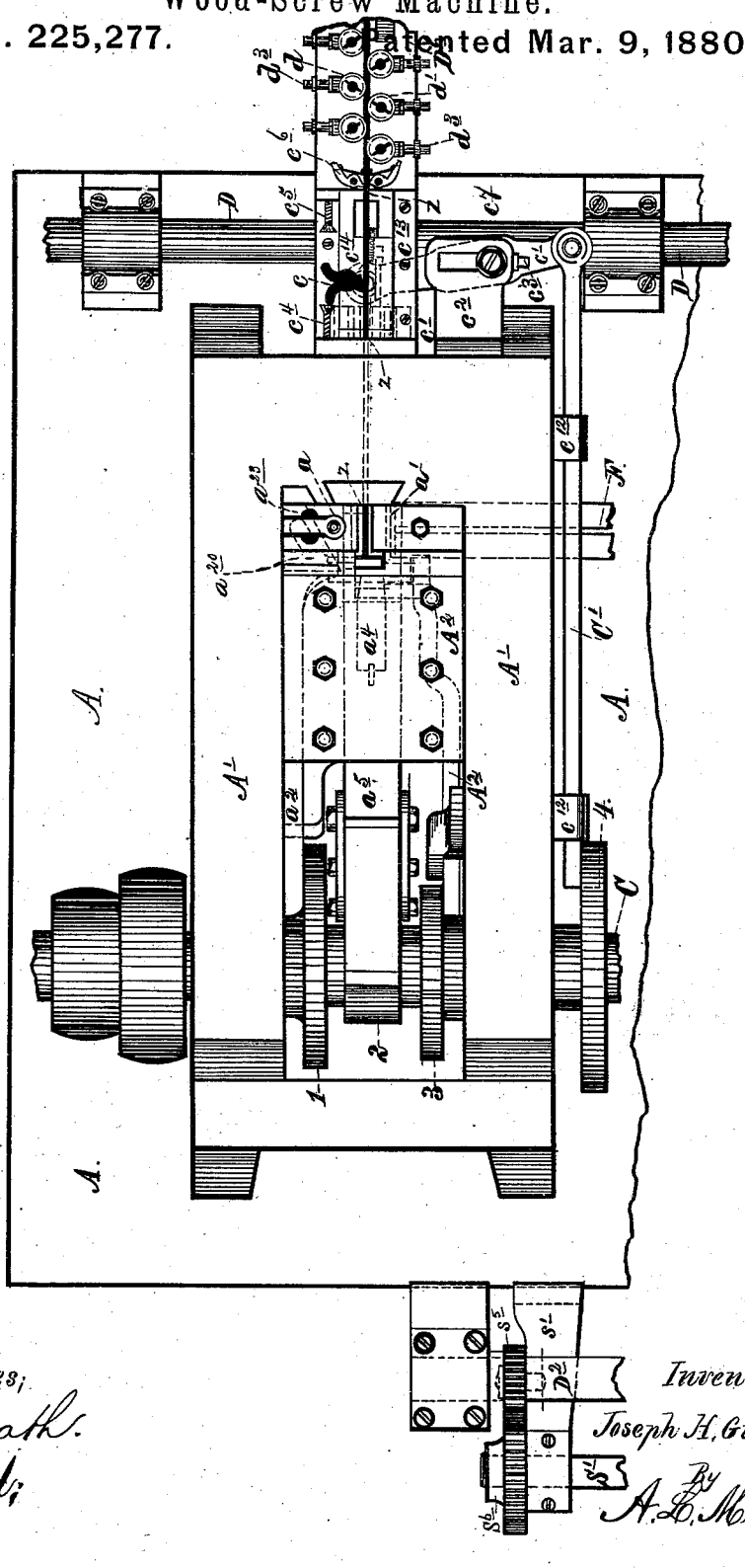

J. H. GREENLEAF.
Wood-Screw Machine.

No. 225,277. Patented Mar. 9, 1880.

J. H. GREENLEAF.
Wood-Screw Machine.

No. 225,277.  Patented Mar. 9, 1880.

24 Sheets—Sheet 4.

Witnesses:
E. A. Heath.
G. W. Clark

Inventor
Joseph H. Greenleaf

By A. L. Munson.
Atty

J. H. GREENLEAF.
Wood-Screw Machine.
No. 225,277. Patented Mar. 9, 1880.
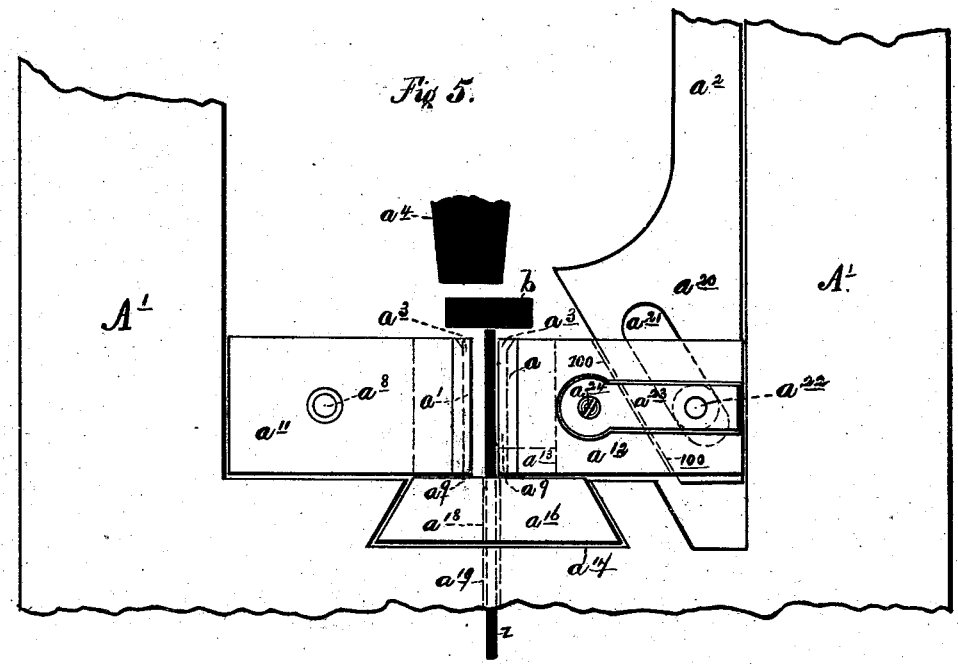
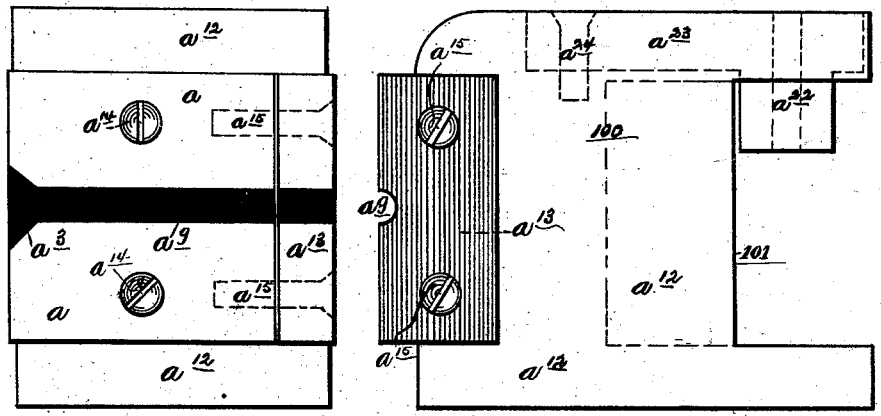
Witness
E. H. Heath.
E. G. Ward.
Inventor,
Joseph H. Greenleaf,
By A. L. Munson,
Atty

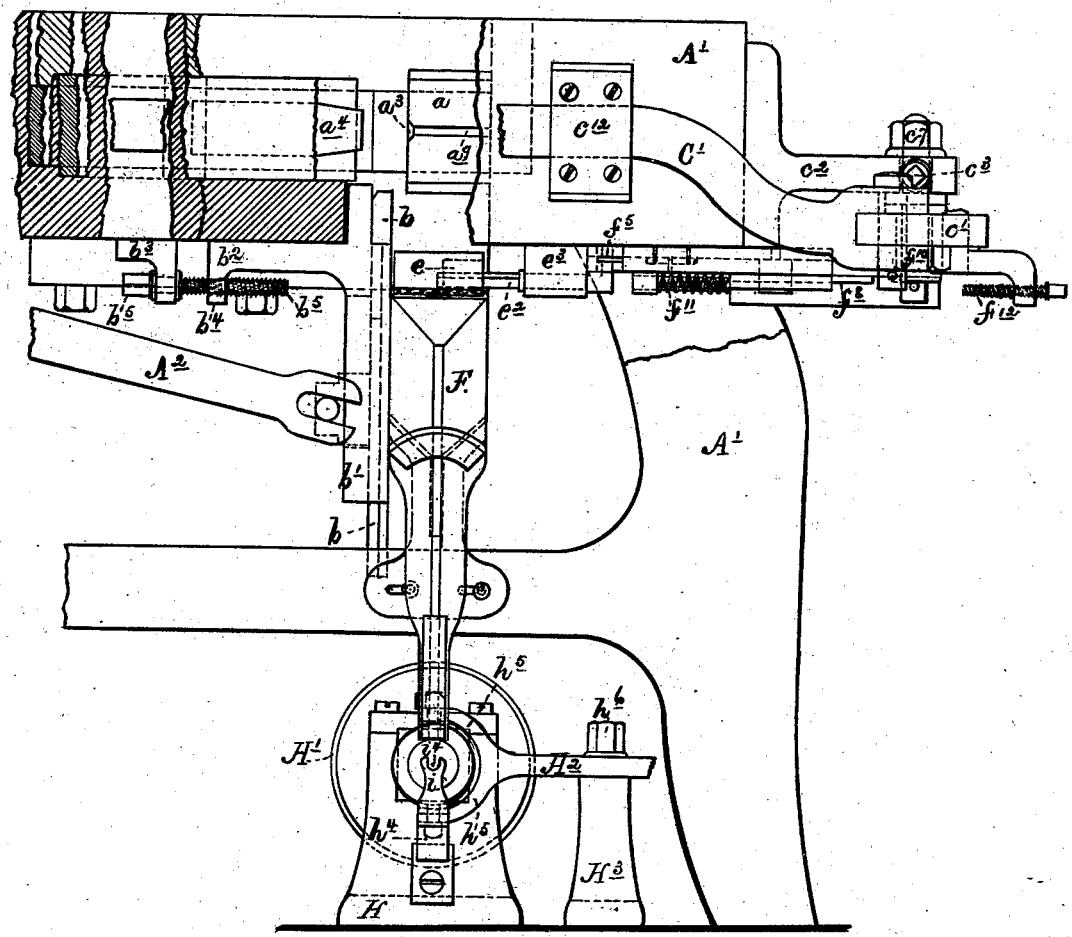

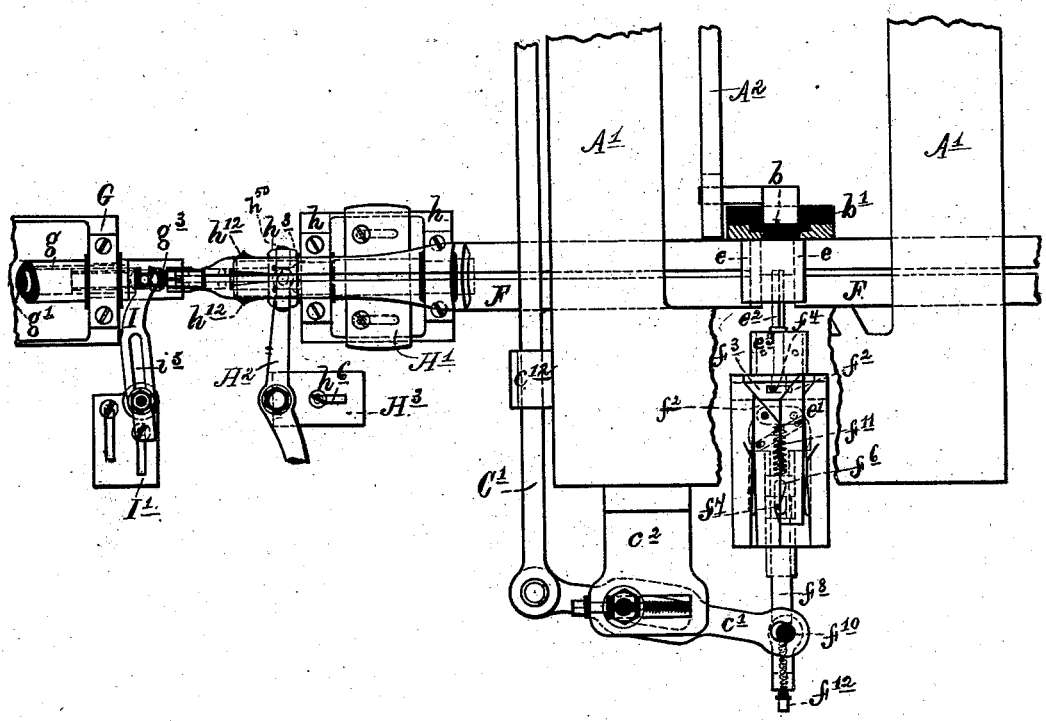

24 Sheets—Sheet 8.

J. H. GREENLEAF.
Wood-Screw Machine.

No. 225,277. Patented Mar. 9, 1880.

Witnesses;
E. N. Heath.
G. W. Clark.

Inventor
Joseph H. Greenleaf,

By A. L. Munton,
Atty,

J. H. GREENLEAF.
Wood-Screw Machine.

No. 225,277.

24 Sheets—Sheet 9.

Patented Mar. 9, 1880.

Fig. 10½.

Witnesses:
E. A. Heath.
G. W. Clark

Inventor,
Joseph H. Greenleaf.

By A. L. Munson,
Atty.

J. H. GREENLEAF.
Wood-Screw Machine.

No. 225,277. Patented Mar. 9, 1880.

Witnesses:
E. A. Heath.
G. W. Clark.

Inventor
Joseph H. Greenleaf,
By A. L. Mumton,
Atty.

J. H. GREENLEAF.
Wood-Screw Machine.

No. 225,277.    Patented Mar. 9, 1880.

Witnesses;
E. A. Heath.
G. W. Clark

Inventor
Joseph H. Greenleaf,

By A. L. Munson
Atty.

J. H. GREENLEAF.
Wood-Screw Machine.

No. 225,277.  Patented Mar. 9, 1880.

Witnesses;
E. N. Heath.
E. G. Ward.

Inventor;
Joseph H. Greenleaf,
By A. L. Munson,
Atty.

J. H. GREENLEAF.
Wood-Screw Machine.
No. 225,277. Patented Mar. 9, 1880.
24 Sheets—Sheet 13.
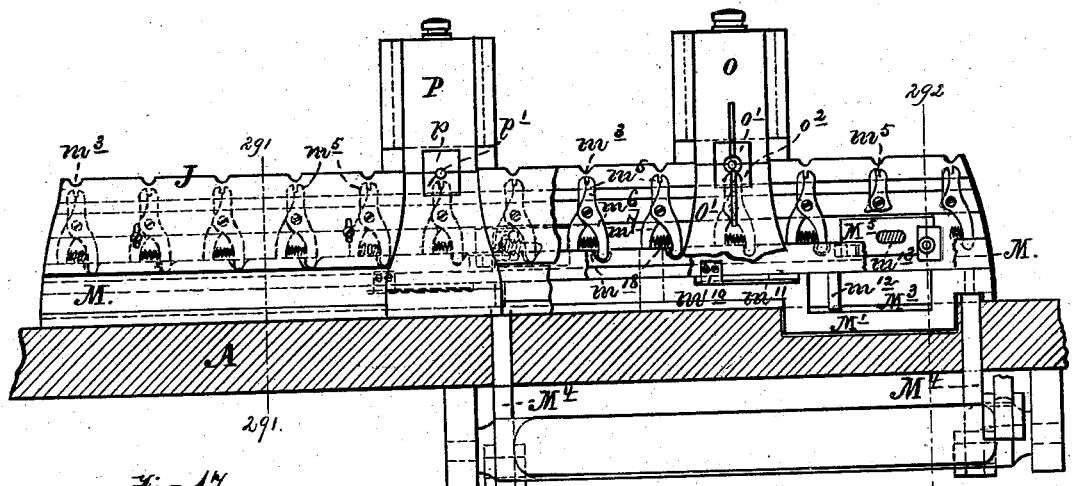
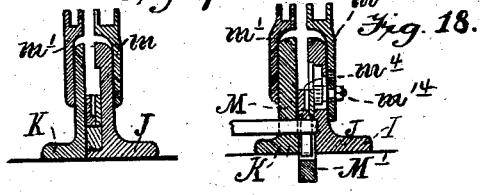
Witnesses;
E. A. Heath.
G. W. Blair.
Inventor
Joseph H. Greenleaf,
By A. L. Munson
Atty.

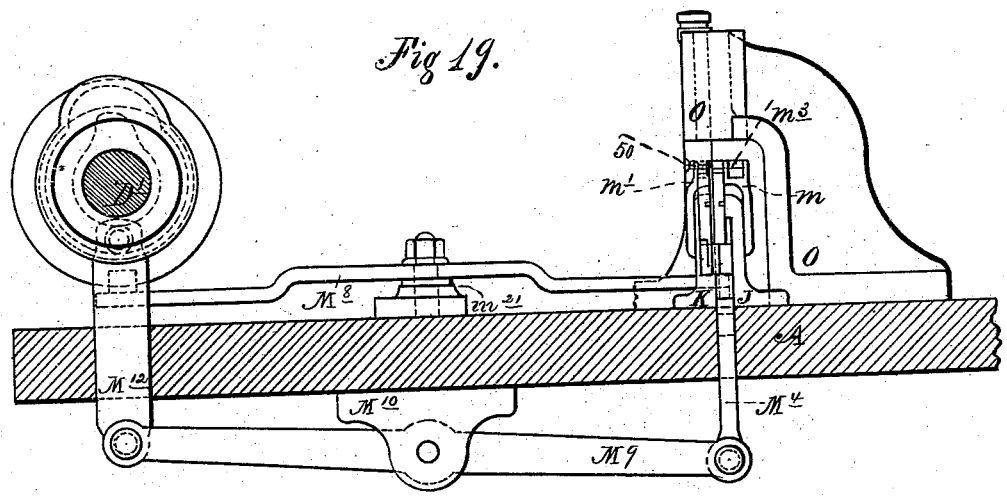

J. H. GREENLEAF.
Wood-Screw Machine.

No. 225,277. Patented Mar. 9, 1880.

24 Sheets—Sheet 15.

Witnesses:
E. A. Heath
G. W. Clark

Inventor
Joseph H. Greenleaf,
By A. L. Munson,
Atty,

J. H. GREENLEAF.
Wood-Screw Machine.

No. 225,277. Patented Mar. 9, 1880.

24 Sheets—Sheet 16.

Witnesses;
E. A. Heath.
G. W. Clark.

Inventor
Joseph H. Greenleaf,

By A. L. Munson,
Atty.

J. H. GREENLEAF.
Wood-Screw Machine.

No. 225,277. Patented Mar. 9, 1880.

24 Sheets—Sheet 17.

Witnesses;
E. A. Heath.
G. W. Clark

Inventor.
Joseph H. Greenleaf.

By A. L. Newton,
Atty.

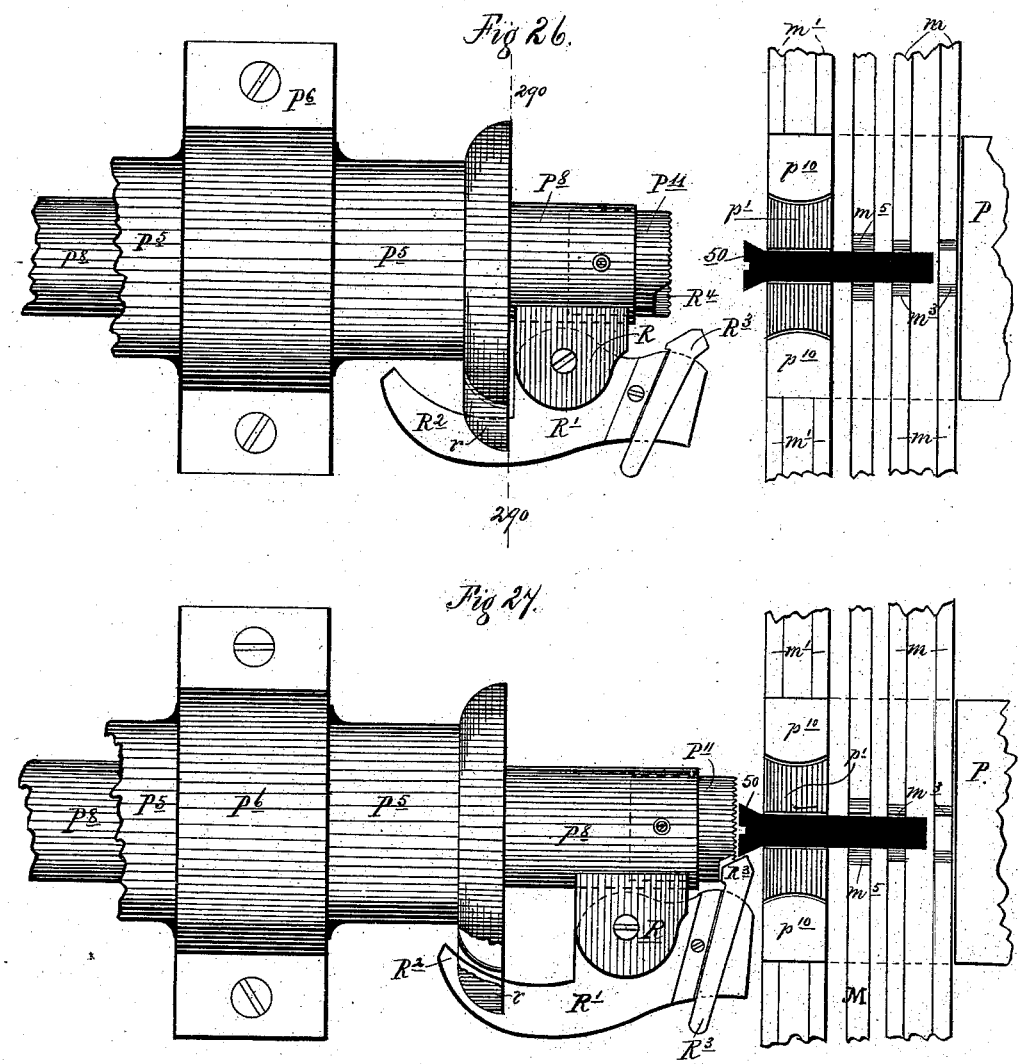

24 Sheets—Sheet 19.
J. H. GREENLEAF.
Wood-Screw Machine.
No. 225,277. Patented Mar. 9, 1880.
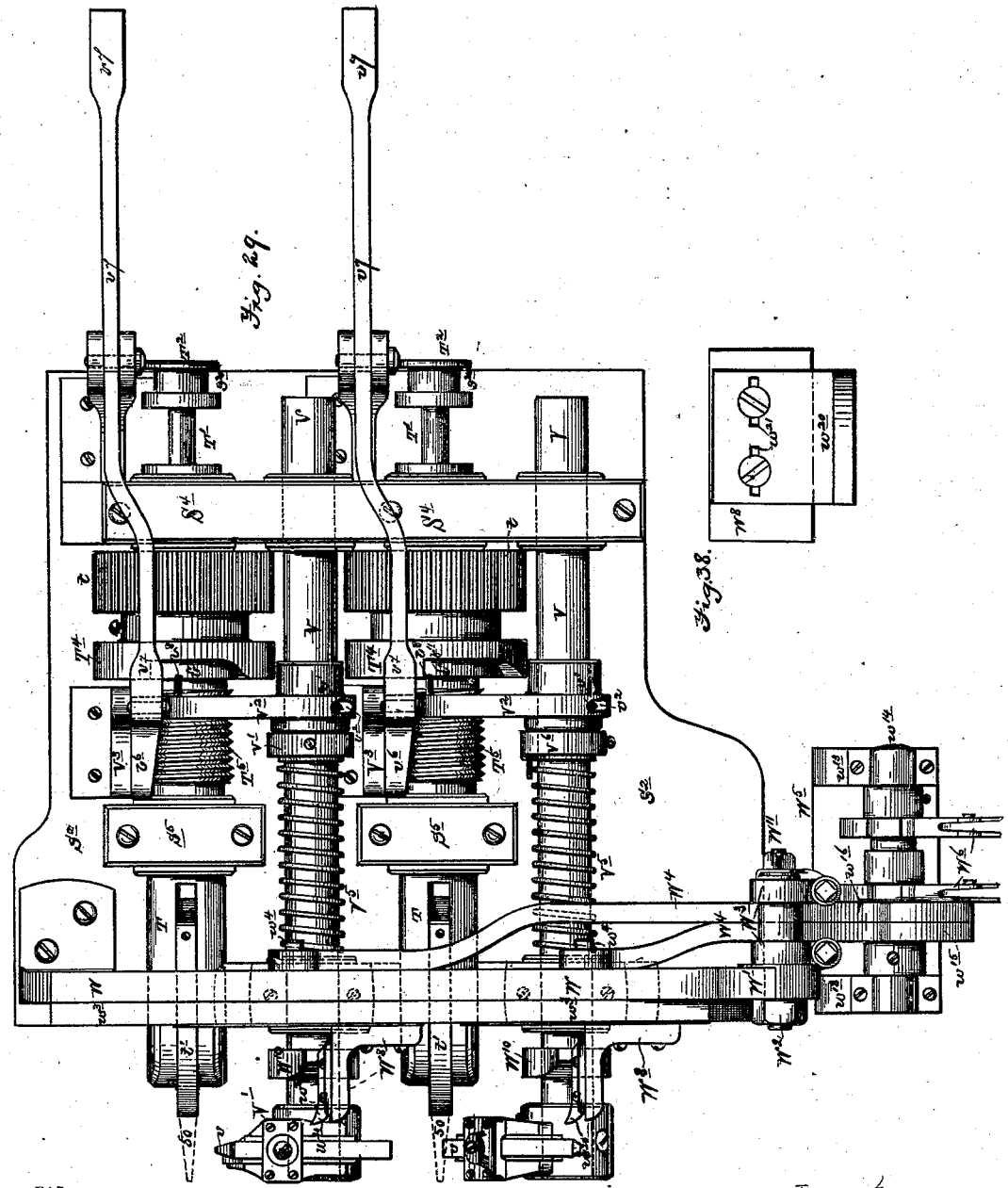
Witnesses,
E. A. Heath.
E. D. Ward.
Inventor
Joseph H. Greenleaf,
By A. L. Minslow.
Atty.

J. H. GREENLEAF.
Wood-Screw Machine.
No. 225,277. Patented Mar. 9, 1880.
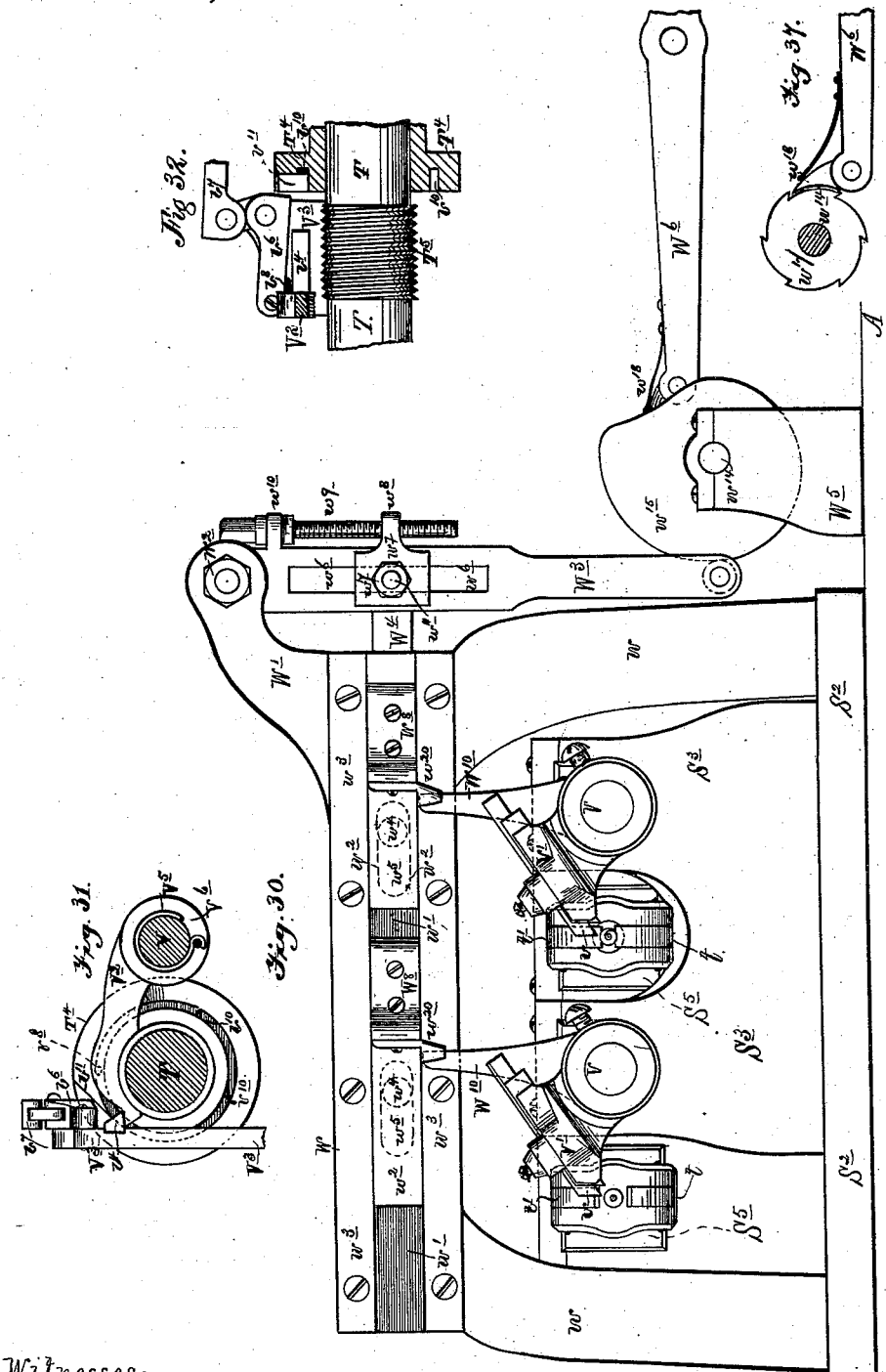
Witnesses:
E. A. Heath.
G. W. Clark
Inventor
Joseph H. Greenleaf.
By A. L. Mundow.
Atty.

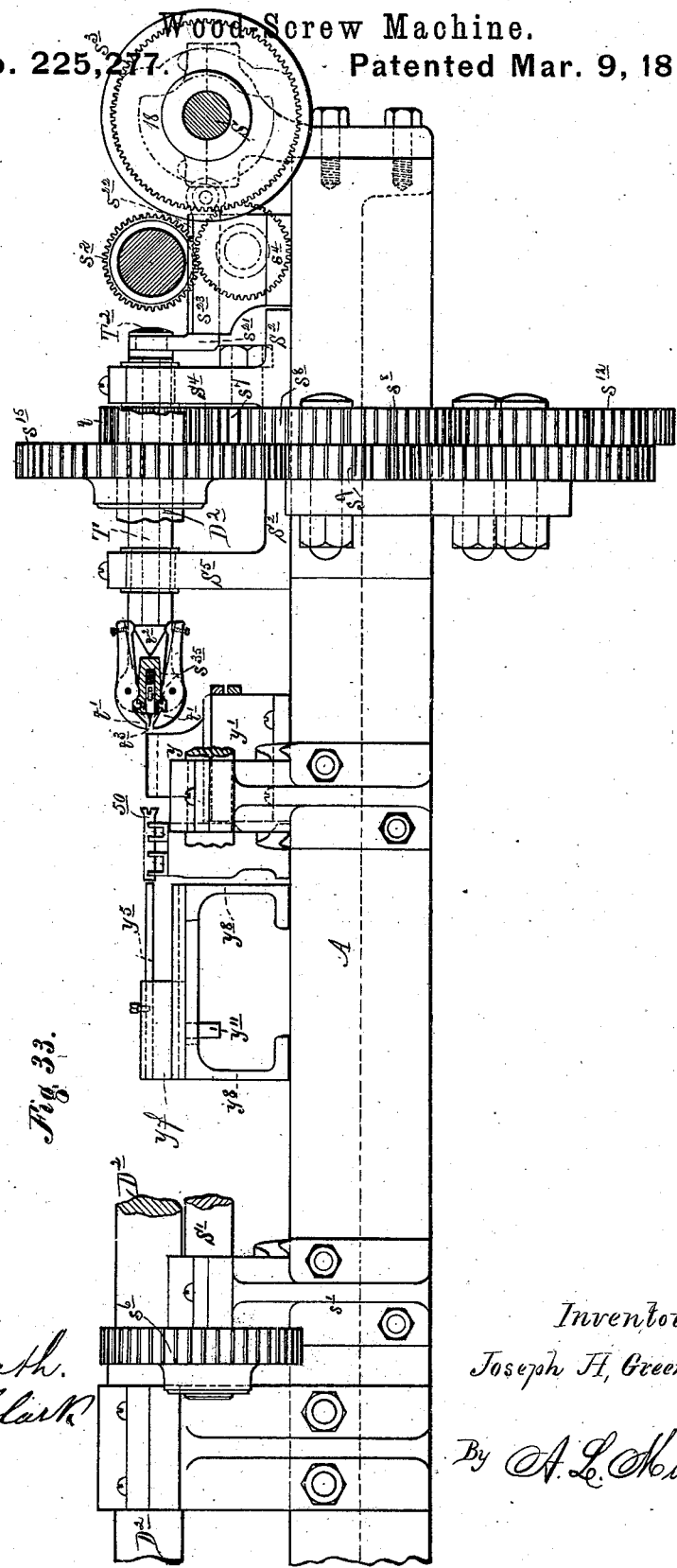

24 Sheets—Sheet 22.

J. H. GREENLEAF.
Wood-Screw Machine.

No. 225,277. Patented Mar. 9, 1880.

Witnesses:
E. A. Heath.
G. W. Clark

Inventor
Joseph H. Greenleaf,

By A. L. Munson.
Atty.

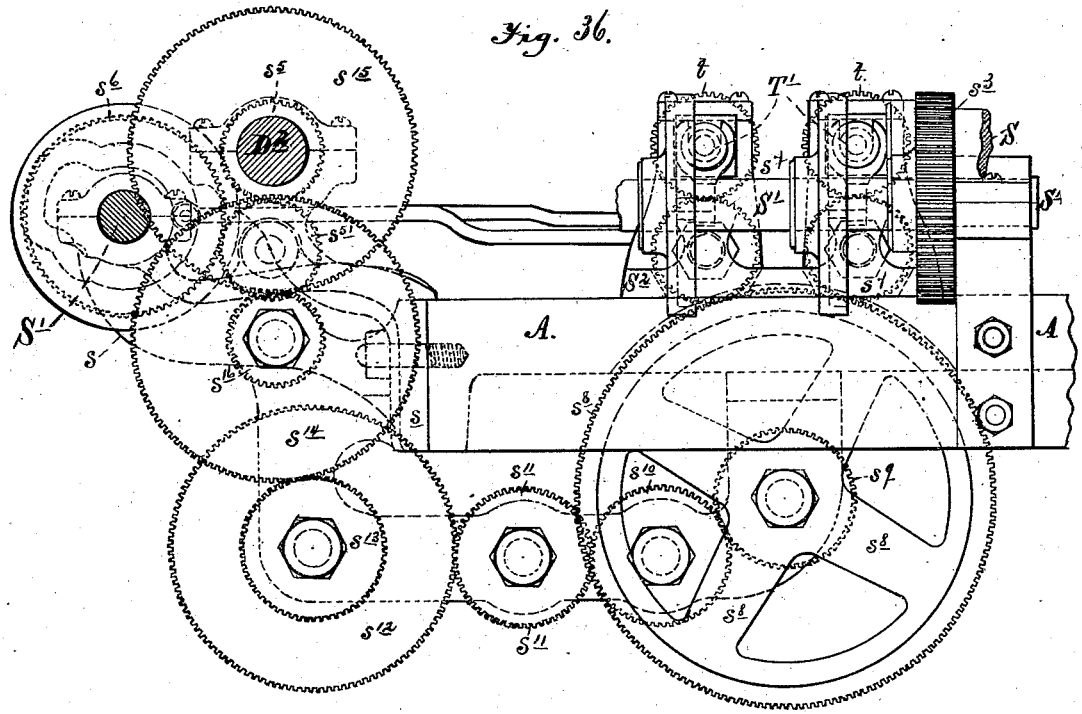

J. H. GREENLEAF.
Wood-Screw Machine.

No. 225,277.   Patented Mar. 9, 1880.

UNITED STATES PATENT OFFICE.

JOSEPH H. GREENLEAF, OF NEW HAVEN, CONNECTICUT, ASSIGNOR TO THE NEW YORK SCREW COMPANY, OF NEW YORK, N. Y.

WOOD-SCREW MACHINE.

SPECIFICATION forming part of Letters Patent No. 225,277, dated March 9, 1880.

Application filed October 25, 1878.

*To all whom it may concern:*

Be it known that I, JOSEPH H. GREENLEAF, a resident of the city and county of New Haven, and State of Connecticut, have invented certain new and useful Improvements in Automatic Screw-Machines for the Manufacture of Wood-Screws, of which the following is a full, clear, and exact specification.

This invention relates to that class of machines organized for and adapted to the manufacture of wood-screws of any and all descriptions.

In the present invention the machine is entirely automatic in its functions and operations, and finishes the screw, in every detail, in the one combined machine. The machine is also so constructed and arranged that its operating parts can be adjusted to manufacture all of the various sizes and varieties of screws of the class commercially known as "wood-screws."

While this organized machine is particularly designed and arranged for the manufacture of the wood-screw shown and described in Letters Patent No. 161,390, of March 30, 1875, and reissues thereof, Nos. 6,729 and 6,730, of November 9, 1875, issued to the New York Screw Company, as assignee of Allan Cummings, of New York city, such wood-screw being provided in the center of its head with an angular cavity in lieu of the usual slot, or with an angular cavity in addition to the usual slot, it is at the same time so arranged as to be adapted to making the ordinary wood-screw of commerce, provided with a slot or nick milled or sawed across the face of its head; also, a screw having centrally in its head a round or conical cavity, either in connection with or without the usual slot or nick. All of these various forms of screws are finished up with a tapering screw-thread, which terminates in a gimlet-point, as is usual in the case of the ordinary and well-known wood-screw.

The machine is perfectly automatic in its operations; and its organization consists in the combination of various novel devices whereby the said screws are rapidly produced in a perfect manner from a coil or any continuous supply of wire. This wire, of the proper gage to form the screw, is fed forward intermittingly the necessary length or distance to form a screw-blank by means of a feeding-dog, which clutches and draws it a specified distance through a straightening device and delivers it to the action of the heading-dies, which are arranged and operated in a power-press of peculiar form. By the action of such dies and power-press the usual form of conical head is formed upon the end of the wire by upsetting the metal into a conical recess formed in the face of the dies for that purpose. The blank upon which the conical head is formed is severed from the wire by the action of the dies when closing upon the wire previous to the formation of the conical head thereon.

The headed blank thus formed is, after its release from the dies, dropped through the press upon an oscillating shelf or table arranged to receive it. This oscillating table alternately throws the blanks to the right or to the left, or either way, as may be desired, to a slotted conveying-trough, which conveys them to the action of the other parts of the machine, which are arranged on the right and left of the heading-press in case of a double machine, or to the right or left alone in the case of a single machine. The headed screw-blanks are, in turn, delivered first to the action of the first shaving and the drilling devices, the drilling apparatus consisting of a reciprocating rotating drill and a rotating clutch or clamping device, which receives, seizes, and holds the screw-blank while the shaving and drilling take place. The rotating clutch and drill are revolved in opposite directions, which arrangement facilitates the drilling operation.

The process of drilling and shaving being completed, the screw-blank is released from the grasp of the rotating clutch, and withdrawn therefrom by a suitable device, on which it rests, and from which it is seized by the first jaws of a transferring apparatus, which conveys each blank in turn, by means of a series of grasping-jaws, to the various other operating devices in the machine until it reaches the final operation of thread-cutting. This transferring device has a series of adjustable jaws, which are given a series of distinct and stated movements, as follows: The jaws are first opened when they rise from their bed to grasp the blanks. They are then moved to the left a predetermined distance, then down, carrying the blanks into suitable seats prepared in the frames to receive them. The jaws open as they descend, thus leaving the blanks in the seats as the jaws fall below them. A movement to the right then takes place until their first position is reached, when they again rise and seize upon the blanks, the previous movements, as detailed, being again repeated. These operations serve to transfer the blanks one seat to the left at each movement to the left, and as the series of jaws all operate in unison, it will be seen that a number of blanks are thereby being continuously carried to the various operating parts of the machine.

From the shaving and drilling apparatus the blank is transferred to the action of the punching, or to the punching and slotting, or to the slotting, devices, as the case may be. The transferrer delivers the blank into the jaws of a small power-press, which seizes upon and holds the blank firmly in its position, the conical head projecting beyond the face of the press. An angular punch is then, by means of suitably-arranged devices, forced into the round hole previously drilled in the head of the screw-blank. This action results in displacing the metal and forcing it down to the bottom of the hole, thus causing the cavity to take an angular form of the shape of the punch. The punch is then retired, and the slot, if the screw-head is to have both cavity and slot, is milled or sawed across the face of the head of the blank by a properly-arranged apparatus. This slot will be cut parallel with the squared hole, as the press will hold the blank immovably until both of the operations are completed. The blank is then released and transferred to the device for reshaving the face and rear of the head, which removes any and all burr or irregularity left by the action of the punch or saw in the previous operations. The screw-blank is next transferred to the thread-cutting devices, where the final and finishing process of cutting the tapering thread is completed.

All of these various devices, the details of their construction, application, combination, and operation, will be hereinafter fully pointed out and described.

Figure 2:
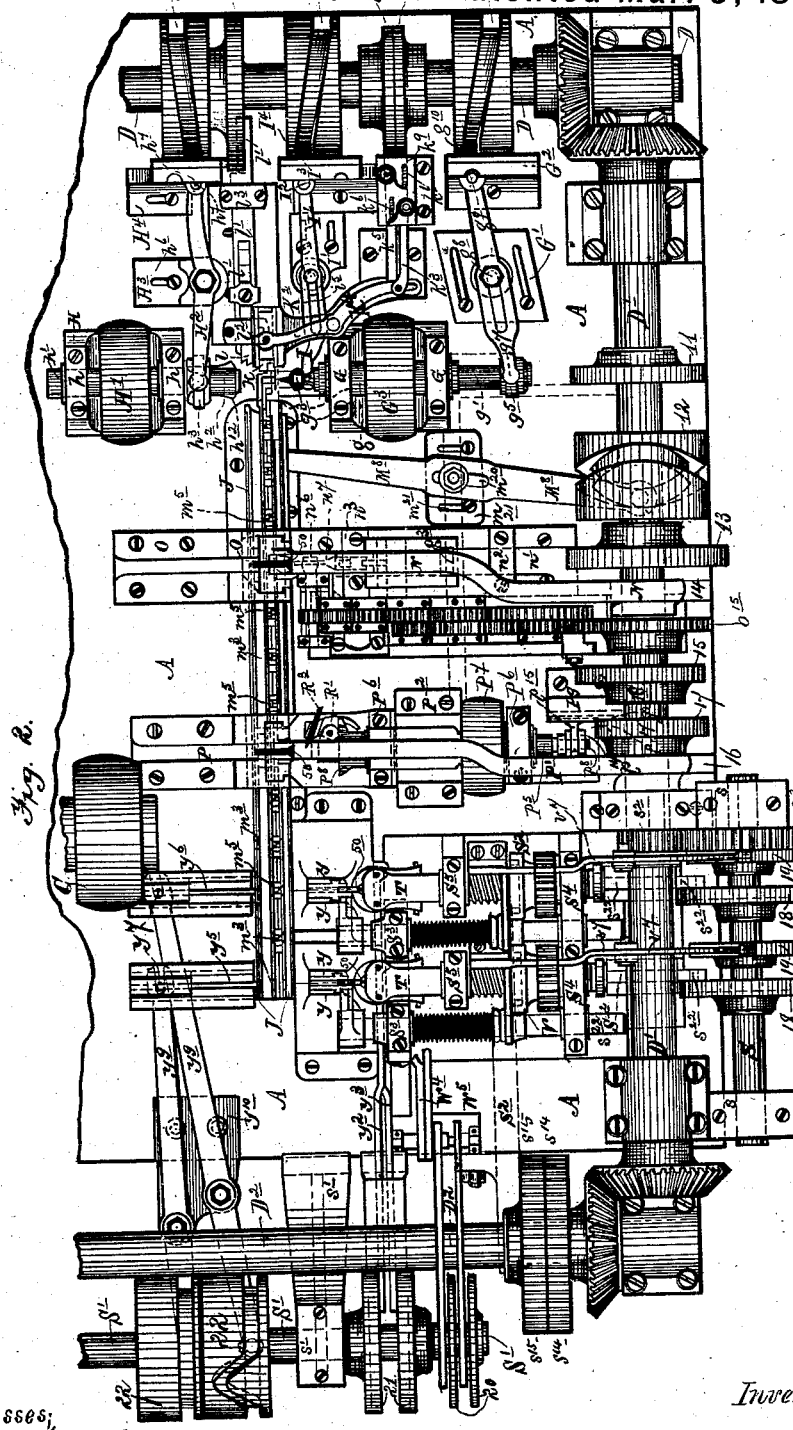
Figure 3:
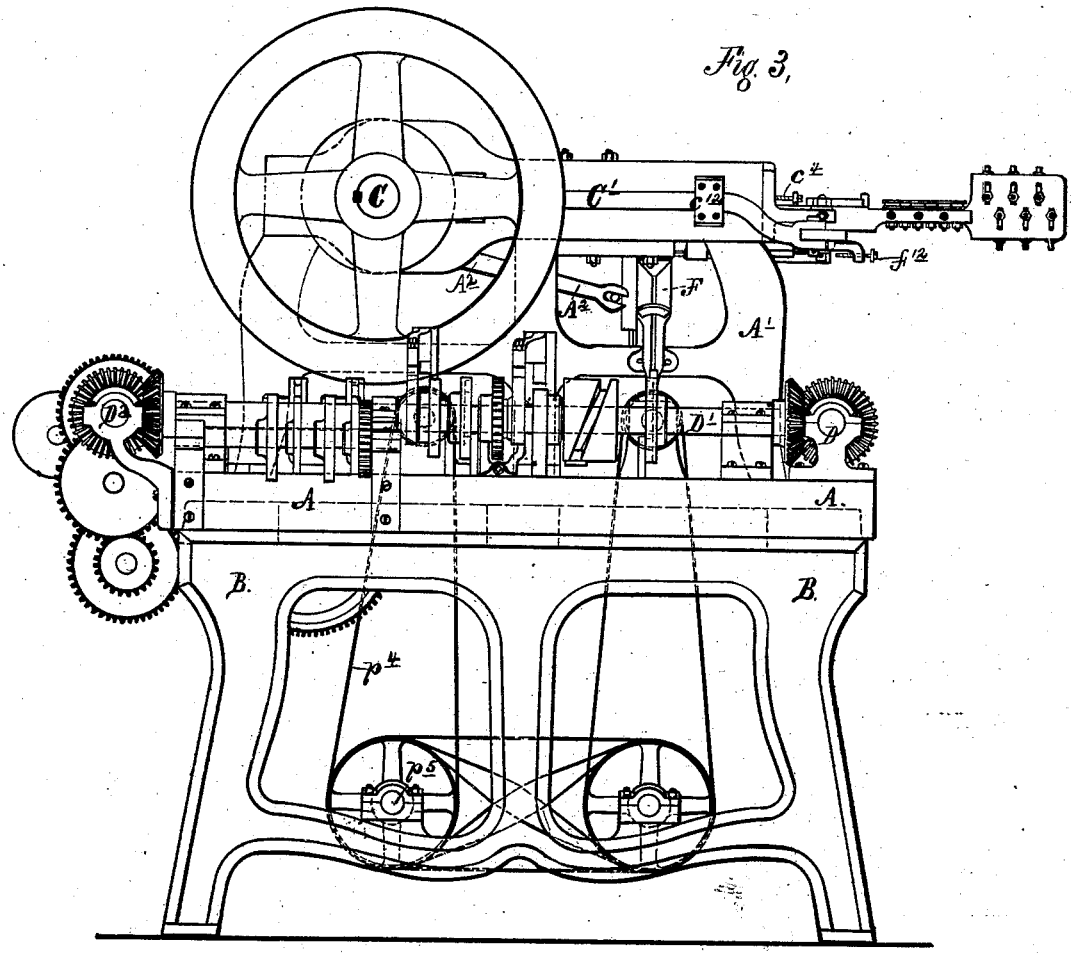
Figure 4:
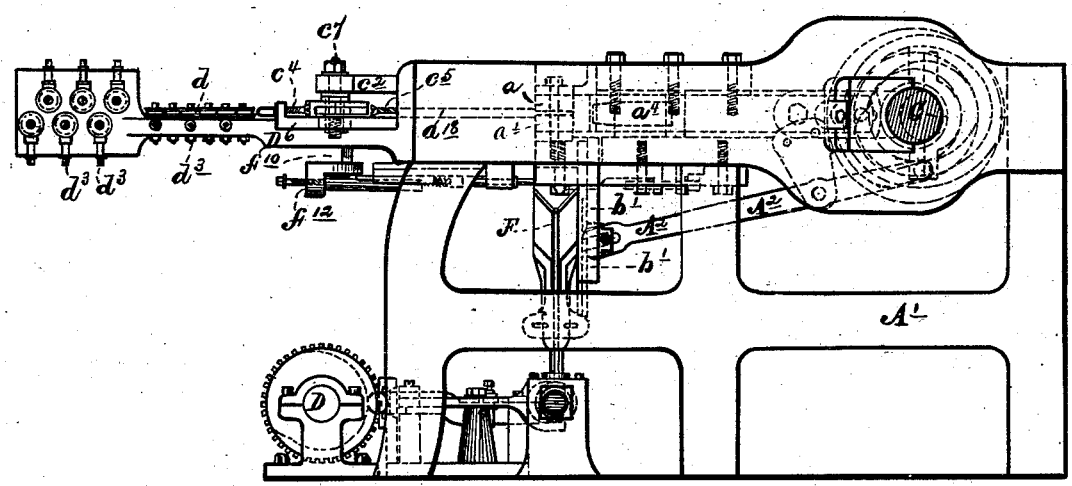
Figure 10:
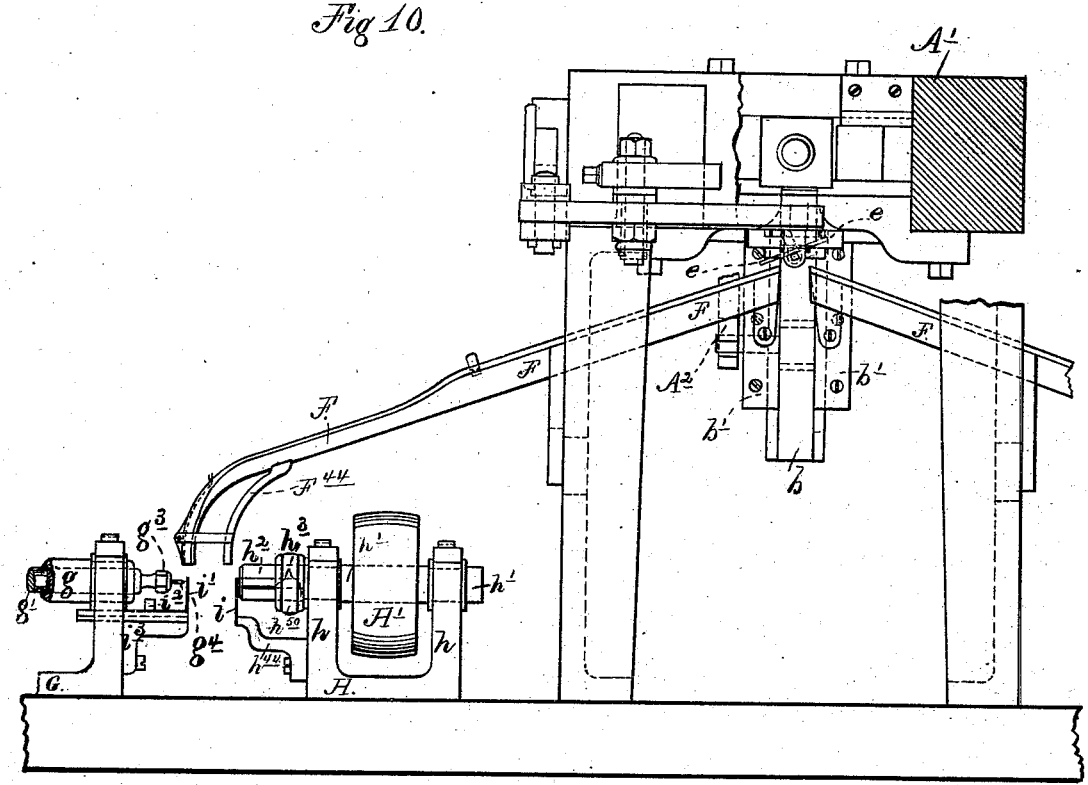
Figure 11:
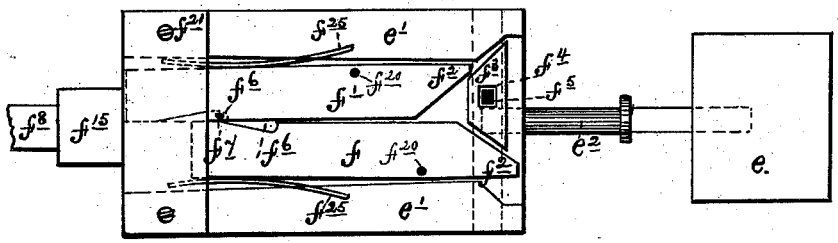
Figure 12:
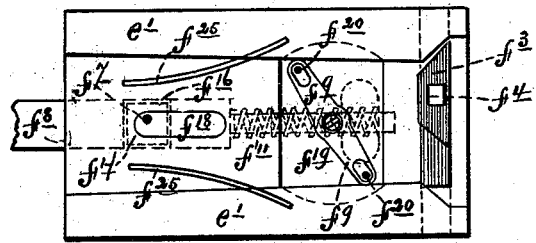
Figure 13:
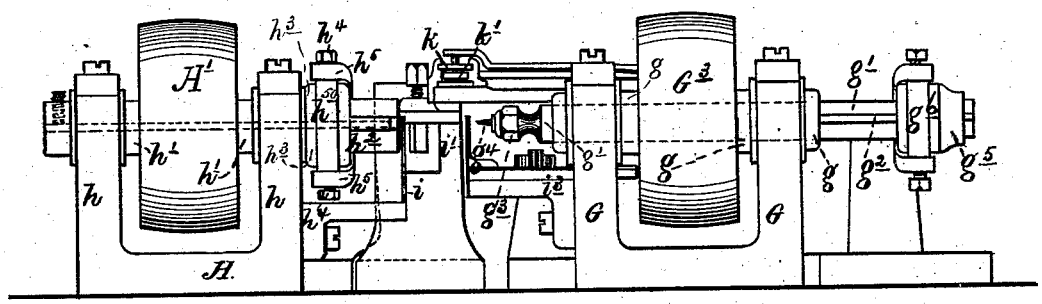
Figure 14:
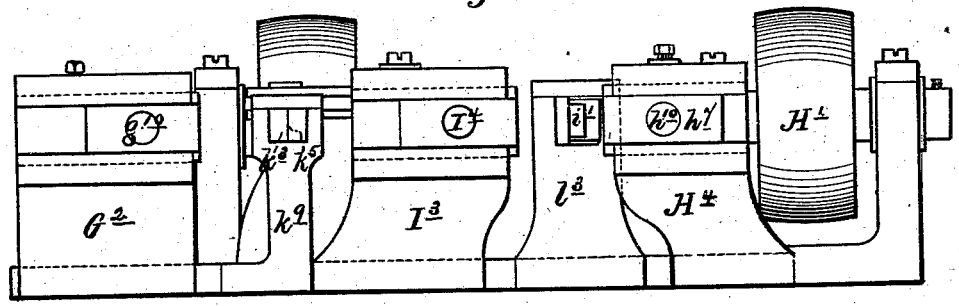
Figure 15:
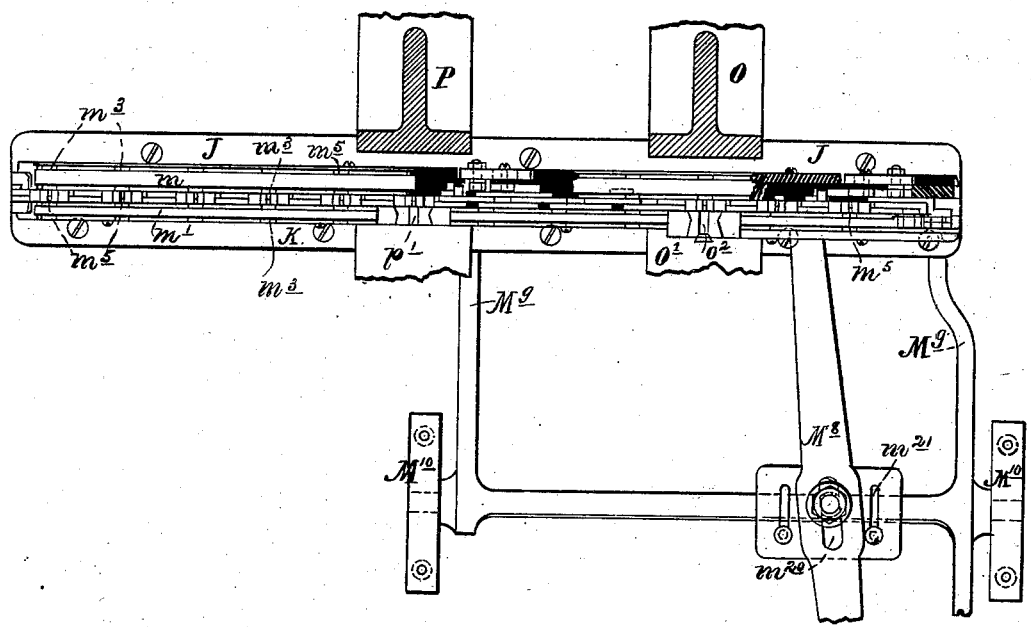
Figure 20:
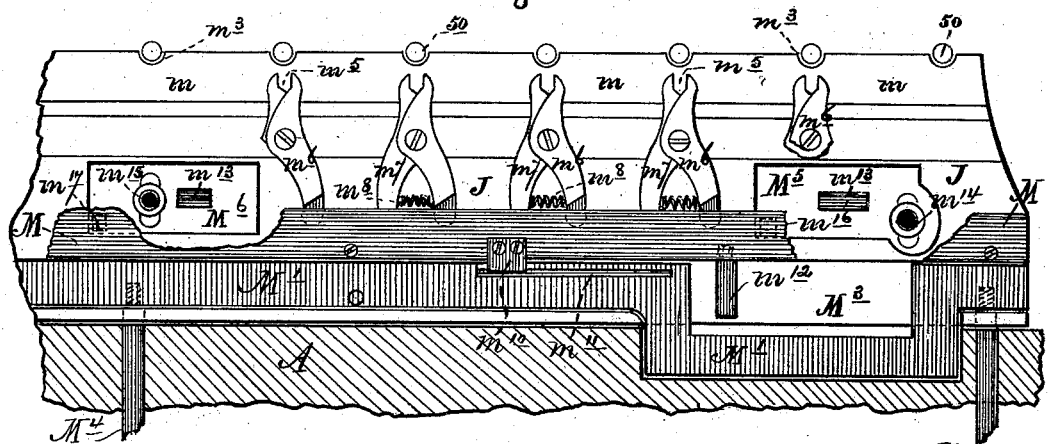
Figure 21:
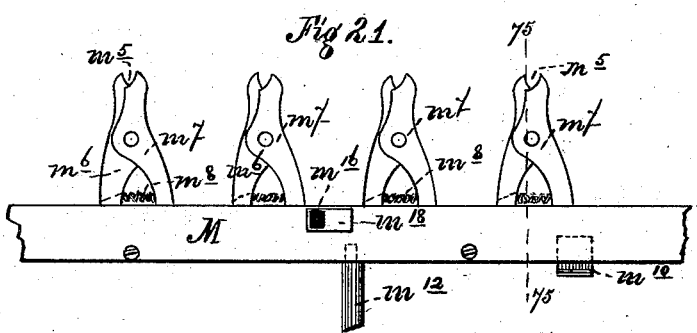
Figures 22, 23:
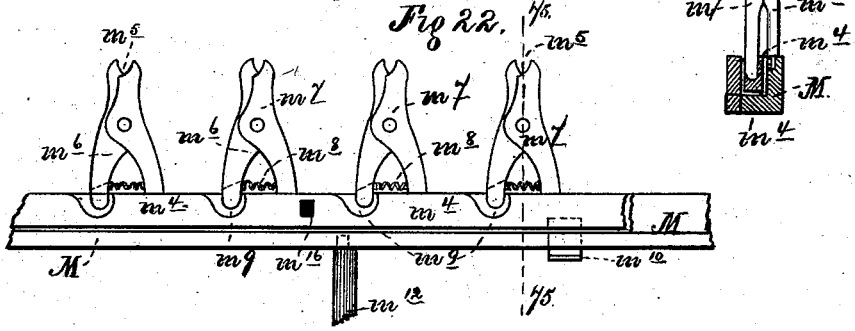
Figure 24:
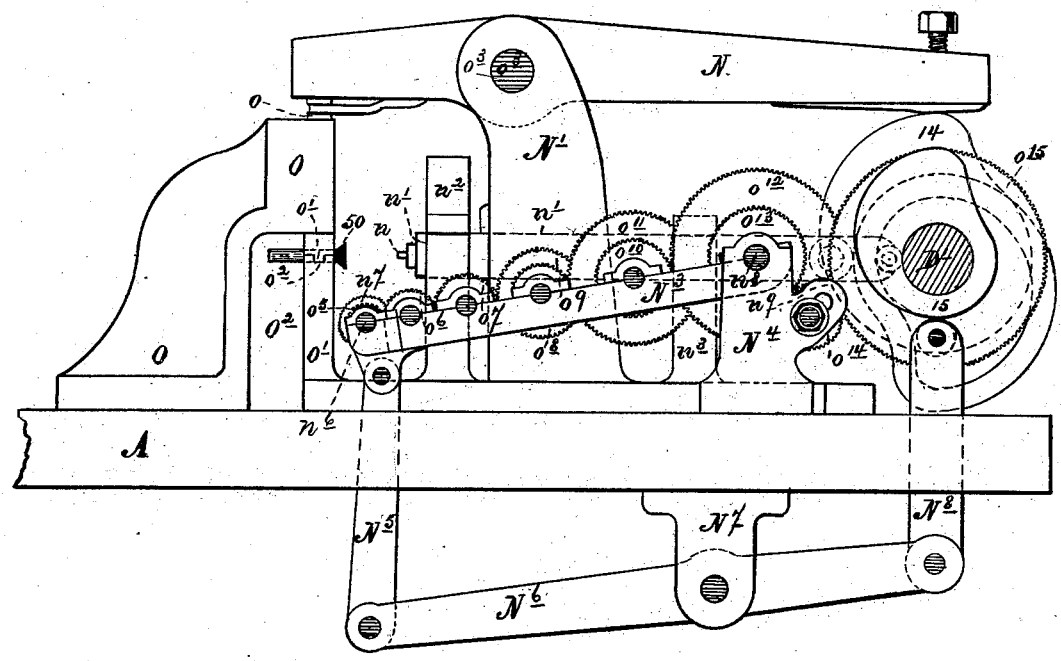
Figure 25:
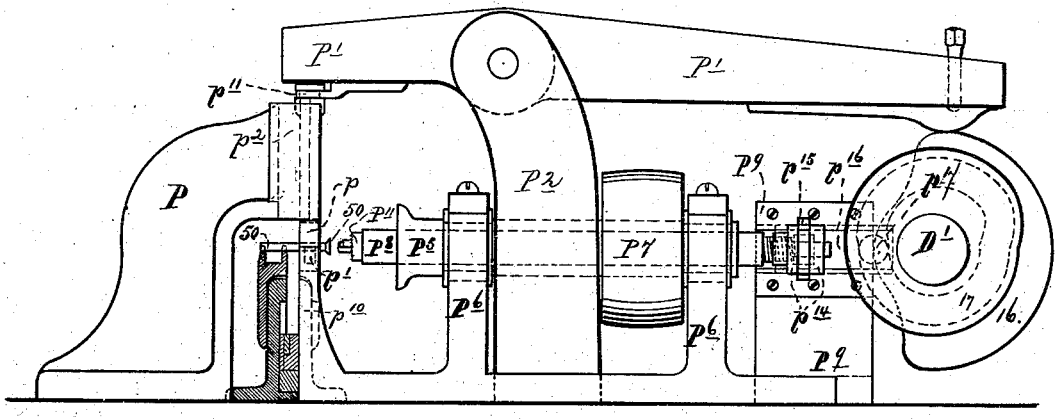
Figure 28:
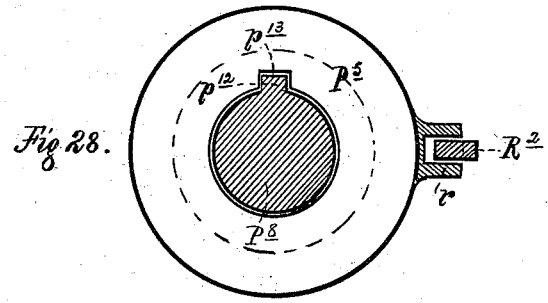
Figures 34, 35:
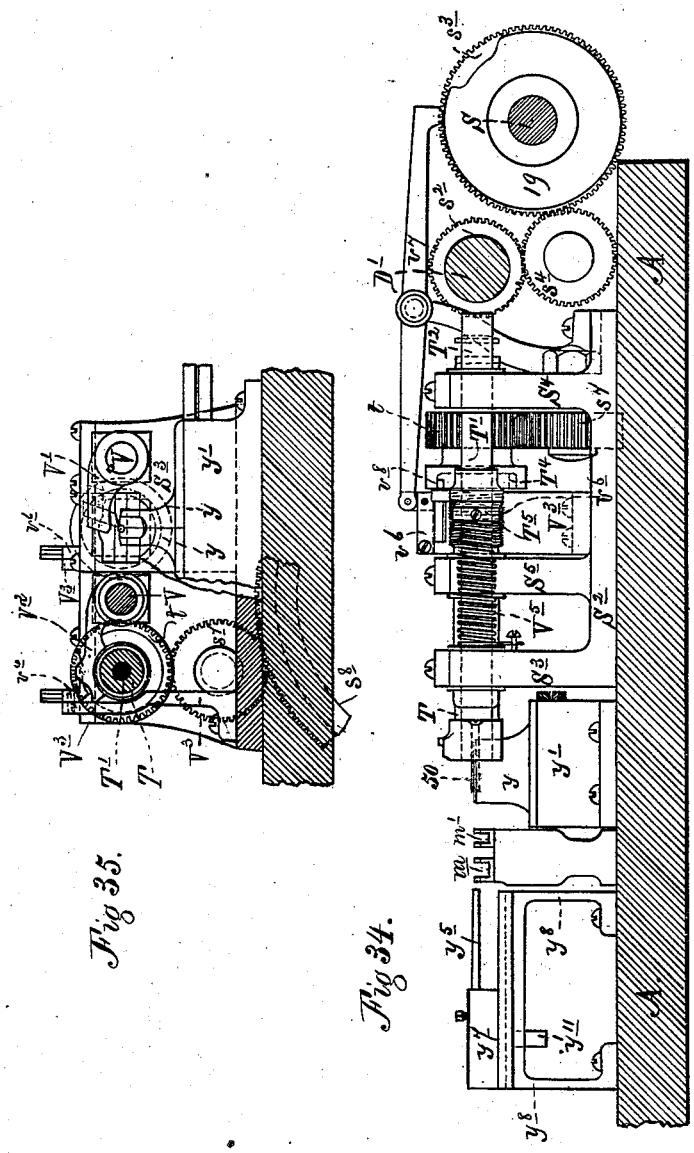
Figure 39:
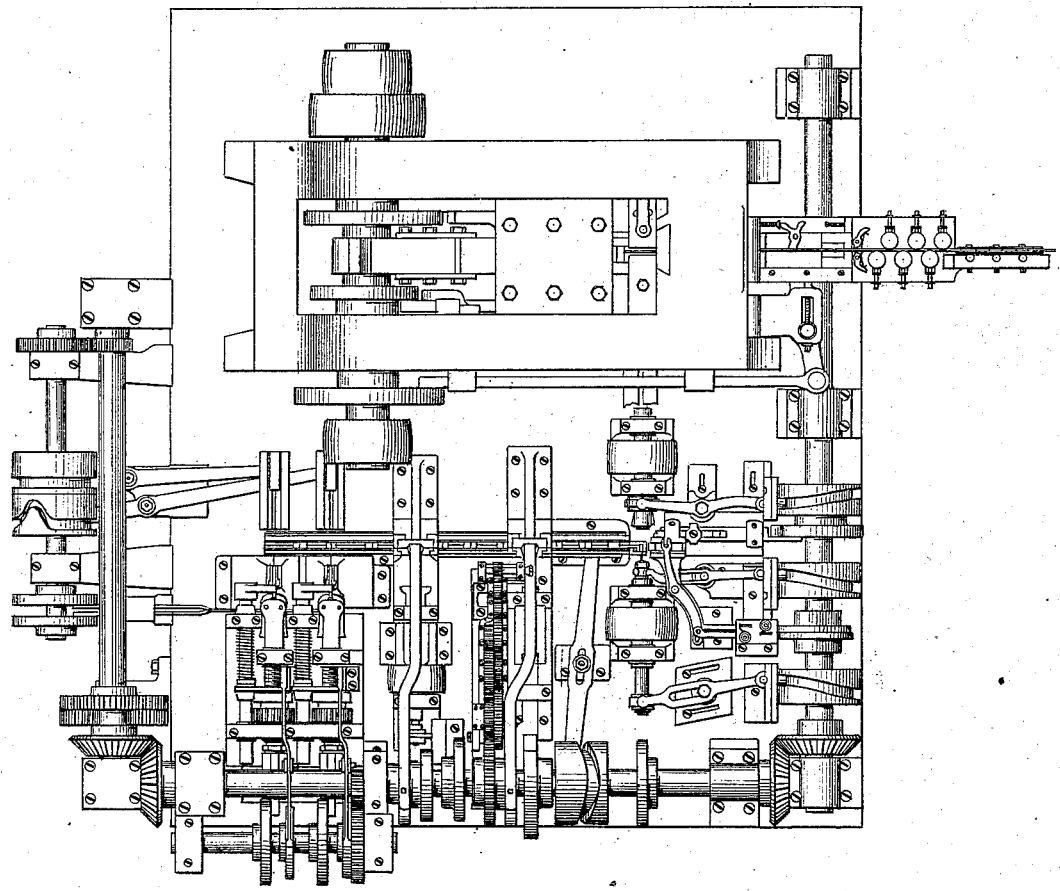

In the drawings, which form an essential part of this specification, Figure 1 represents a plan view of the heading-press and its various attachments. Fig. 2 represents a plan view of the screw-machine proper. Fig. 3 is a left-hand end view of the machine as a whole. Fig. 4 is a right-hand end view of the heading-press. Fig. 5 is a plan view of part of the heading-press, showing the operation of the various dies, upsetting-punch, and stop. Fig. 6 is an end elevation of one of the dies and its seat. Fig. 7 is a front elevation of the same. Fig. 8 is a longitudinal sectional elevation of the heading-press. Fig. 9 is also a plan view of the heading-press, showing the various attachments thereto for delivering the headed blanks to the drilling and shaving apparatus. Fig. 10 is a cross-section of the same. Fig. 10½ is an enlarged view, showing the relations between the carrying-trough, dividing or separating fingers, guide-rests, drill, &c., at the time of delivering a screw-blank to the action of the drill. Fig. 11 is a detached plan view of the apparatus for operating the oscillating table. Fig. 12 is also a view of the same, showing details of construction. Fig. 13 is a detached elevation of the drilling apparatus. Fig. 14 is a front elevation of the guides for the levers which operate the drilling and shaving apparatus. Fig. 15 is a plan view of the transferring apparatus. Fig. 16 is a longitudinal sectional elevation of the same. Fig. 17 is a cross-section of the same, taken on line 291 in Fig. 16. Fig. 18 is also a cross-section of the same, taken on line 292 in Fig. 16. Fig. 19 is an enlarged transverse section of the transferring apparatus and its operating-levers. Fig. 20 is an enlarged longitudinal section of the transferring apparatus, showing the operating parts in detail. Fig. 21 is a detached enlarged view of the transferring-jaws removed from the casing. Fig. 22 is also an enlarged view of the same, having a portion of the carrying-frames removed. Fig. 23 is a cross-section of the same, taken on line 75 in Figs. 21 and 22. Fig. 24 is a side elevation of the punching and slotting devices. Fig. 25 is a side elevation of the reshaving apparatus and its various operating parts. Figs. 26 and 27 are detached views of the reshaving apparatus enlarged and showing details of its operation. Fig. 28 is a front view, partly in section, taken on the line 290 in Fig. 26. Fig. 29 is an enlarged detached plan view of the screw-threading apparatus. Fig. 30 is a front elevation of the screw-threading apparatus. Fig. 31 is a detached sectional view of the cams and levers which govern the longitudinal movement of the screw-thread cutters. Fig. 32 is a detached side view of the same. Fig. 33 is a longitudinal sectional elevation taken centrally through one of the screw-threading devices and its adjuncts. Fig. 34 is a side elevation of the same. Fig. 35 is a front view, partly in section, similar to that shown in Fig. 31, but showing the double apparatus. Fig. 36 is a sectional elevation, showing the arrangement of gearing for driving the various parts of the screw-threaders. Fig. 37 is a detached view, showing the method of driving, by a step-by-step motion, the cams and levers that control the devices for tapering the blank while the screw-thread is being cut thereon. Fig. 38 is a detached view of the cam arranged for governing the thread-cutters during the process of thread-cutting. Fig. 39 is a plan view, showing the entire combination of devices aggregated as a whole. This drawing, owing to the closeness of the lines, is not lettered, all of its various parts being designated in detail in the various detached views.

The same letters of reference marked on the various figures of the drawings will indicate, locate, and point out corresponding parts.

The machine which is illustrated in the various drawings consists, as previously stated, of a combination or union of various instrumentalities or apparatus, each one of which performs its functions and operations in rotation—that is to say, the screw-blank is first formed by one operation, and thence carried from one apparatus to the other by means of a suitable and peculiarly-constructed transferring device until it is finally discharged from the machine in the form of a perfectly-finished screw.

In the construction of this machine the heading-press may be located between two screw-machines, delivering the blanks alternately to the right and left to such machines, or one screw-machine alone may be used. Both of these arrangements are shown in the drawings, and will be fully described.

In some cases the machine may be divided into two parts or sections, the screw-machine proper forming one and the heading-press the other. This is a matter of convenience in manufacture and the common practice in the use of screw-machines. I therefore propose to use the machine in the various forms, as stated, all of which will be fully detailed in this specification.

In describing the construction and operation of this machine the various devices and apparatus forming the completely-organized apparatus will be taken up consecutively and described in detail, showing both their exact operation as a part of the union and as used when detached therefrom.

The heading-press consists of certain devices arranged to deliver the wire from which the screw-blank is to be formed to the action of suitably-arranged dies which sever the wire, and upon the forward end of the portion severed form the usual conical head by upsetting the metal, and a device for gaging the length of the blank to be cut from the wire. It also has attached a device for straightening the wire and for feeding it forward at the same time to the forming and cutting dies. Also, it is provided with a receiving and delivering table arranged beneath the dies to catch the severed blank as it falls therefrom, this table being arranged to tip alternately to the right and left, delivering a headed blank each time into an inclined slotted conveying-trough, which conveys the blanks and delivers them to the screw-machine proper for its action thereon. This arrangement of the table is only used in case the machine is a double one. In case a single machine is used the oscillating table would be detached or omitted, and the headed blanks discharged directly from the press into the conveying-trough.

In case the heading-press is entirely detached from the screw-machine and is simply used as a means for heading the blanks, the blanks, after being headed, may be deposited in a hopper, and from thence fed to and conveyed by the same form of carrying-trough to the screw-machine.

The heading-press illustrated is in all its operating parts made adjustable, so that it may be used to manipulate any gage of wire and turn out headed blanks of various lengths and sizes.

The entire combined double machine is shown in its entirety in Fig. 39; also, in enlarged views, in Figs. 1 and 2, the heading-press and the screw-machine proper being shown as detached from each other.

In the following description of the heading-press particular attention is directed to the views shown in Figs. 1 and 3 to 12, both inclusive.

A designates the bed of the entire machine, upon which are arranged all of the various devices composing its organization. B are the legs and frame upon which the bed A is supported. They also serve as the framing in which certain shafts are mounted, carrying pulleys from which power is communicated, by means of belts, to certain parts of the machine.

A' designates the frame and bed of the heading-press, in which are arranged and operated the forming and cutting dies, punches, and stops, by means of which the wire is manipulated into shape. To this bed and frame the wire straightening and feeding devices are attached, likewise the oscillating table and its operating parts. The bed A' is also provided with suitable legs, by means of which it is securely bolted to the bed A of the machine. At its rear it is provided with suitable boxes and bearings, in which is mounted a main driving-shaft, C, which carries the driving-pulleys and balance-wheel, and power and motion may be communicated therefrom, by means of suitable gearing or belts, to the driving-shafts $D^2$ of the screw-machine proper. It also carries the cams and eccentrics by means of which the levers, dies, &c., of the heading-press are operated.

$a$ and $a'$ are the heading-dies, the arrangement of which is shown best in Figs. 5, 6, and 7. They have formed in the inner face of each one-half of the recess $a^9$, through which the wire passes, and at their front face in each is formed one-half of the conical-shaped recess $a^3$, into which the end of the wire is to be upset to form the conical head of the screw-blank.

The die $a'$ is mounted in a suitable recess formed to receive it in the stand $a^{11}$, which is securely embedded in its seat in the frame A' by means of a screw or bolt, $a^8$, and thus becomes a fixed die. The corresponding die, $a$, is formed in two parts $a$, and the cutting-die $a^{13}$, which parts or sections are mounted in a stand or frame, $a^{12}$, and are secured thereto by means of screws $a^{14}$ and $a^{15}$. This frame $a^{12}$ is adjusted in ways in the bed A', opposite the die a', (see Fig. 5,) and has imparted to it a lateral reciprocating motion, in order to open and close the recess $a^9$ and bring the two dies together, in the manner as will presently be more fully described.

$a^{16}$ is an auxiliary cutting-die, which is secured in place in a dovetailed recess, $a^{17}$, in the bed A'. It has drilled through its center a hole, $a^{18}$, corresponding with a hole, $a^{19}$, in the bed A', through which the wire is passed to the action thereupon of the dies $a$ and $a'$.

The frame or stand $a^{12}$, in which the dies $a$ $a^{13}$ are mounted, is recessed at an angle from the rear, as shown by the dotted lines 100 in Fig. 5, and from dotted line 100 to line 101 in Fig. 6. This inclined wedge-shaped recess is for the purpose of receiving the wedge-shaped end $a^{20}$ of a slide, $a^2$, which receives a reciprocating motion at the proper time by means of a cam, No. 1, on the main shaft C. This wedge-shaped end $a^{20}$ of the slide $a^2$ is provided with an inclined slot, $a^{21}$, into which is entered a pin, $a^{22}$, provided with a friction-roller, which depends from a metal piece, $a^{23}$, inserted in a recess cut into the top of the frame $a^{12}$ to receive it, and secured therein by a screw, $a^{24}$.

It is obvious that if the slide $a^2$ is moved forward it will, by reason of its wedge shape pressing against the corresponding face of the recess in the frame $a^{12}$, cause the frame to move to the left, carrying with it the die $a$, until it closes up against the face of the die $a'$, and that a reversed motion of the slide will retract the frame and die to their first position, the pin $a^{22}$, acting in the slot $a^{21}$, being the controlling medium in the reverse movement. The normal position of the dies is that shown in Fig. 5.

The wire to be manipulated (designated by the letter $z$) is fed forward until its end strikes against the stop $b$, which is raised into position for that purpose, as will presently be fully explained. The slide $a^2$ is then advanced, forcing the frame $a^{12}$, with its attached dies $a$ and $a^{13}$, to the left. As it reaches the wire $z$ one-half of the diameter thereof enters the recess $a^9$ in the face of the dies. The movement being continued, the cutting-edge of the die $a^{13}$ presses against the wire at the point where it protrudes from the die $a^{16}$ and severs the projecting portion, which remains in the recess $a^9$, and is carried therein until the dies $a$ $a^{13}$ strike the face of the stationary die $a^1$, when the other half of the wire is seated therein. The wire $z$ is thus held in the recessed dies, its rear end resting against the face of die $a^{16}$, its forward end projecting from the conical recess $a^3$ in and beyond the front face of the dies $a$ $a'$, ready for the action thereupon of the upsetting-punch. This upsetting-punch $a^4$ is secured in the forward end of the lever $a^5$, which is mounted in suitable guides in the frame A', the lever $a^5$ receiving a reciprocating motion by means of the eccentric-cam 2 on the main shaft C.

$b$ is the stop, which is arranged to gage the length of the screw-blanks, and also governs the amount of the wire left projecting from and beyond the face of the dies $a$ $a'$, from which the head of the blank is to be formed by the upsetting thereof into the conical recess $a^3$ in the dies $a$ and $a'$. This stop is given a rising-and-falling motion in the guiding-frames $b'$, which are attached to the frame A', as seen best in Fig. 8. This guide-frame $b'$ is provided with an extension, $b^2$, to the rear, which is fitted into and reciprocates in a dovetailed recess in the frame A'. This not only holds it in its position, but permits it to have a reciprocating movement in such dovetailed recess, so that the sliding extension $b^2$ of the guide-frame $b'$ may be adjusted and set at any point within the extent of its motion in the dovetailed recess.

To the frame A' is attached a projecting stud, $b^3$, and to the rear end of the rear extension of the guide $b^\times$ is attached a corresponding stud, $b^4$.

An adjusting screw-bolt, $b^5$, is inserted through both ends $b^3$ and $b^4$, and by its action the frame $b'$ is adjusted to and fro. The stop-plate $b$ is raised and lowered at the designated time by means of the lever A$^2$, which receives its motion from a cam, No. 3, on main shaft C, the forward end of lever A$^2$ being forked, (see Fig. 8,) and encircles a pin which projects to the rear from the stop-plate $b$.

The guide-frames $b'$ being recessed permits the lever and pin to operate, the whole arrangement being such as to allow the changing of the position of the guide-frame $b'$ and the stop-plate $b$ without the control of the latter by the lever A$^2$ being lost. This form of adjustment is necessary in order that various sizes and lengths of blanks may be headed in the press.

It is, of course, understood that with each different size of screw-blanks that are to be headed the dies $a$, $a'$, and $a^{16}$ are changed and others supplied in their place; but the stands or frames $a^{11}$ $a^{12}$ remain the same, all the various sizes of dies fitting therein.

$c$ is the feeding-dog, which grasps the wire, and delivers it forward through a hole, $a^{19}$, in the bed or frame A', also through a corresponding hole, $a^{18}$, in the die $a^{16}$, to the position between the heading-dies, as previously described, and as shown in Fig. 5. This dog $c$ is mounted upon a slide, $c^{14}$, which is reciprocated in ways $c^{13}$, formed in a standard or frame which is attached to the face of the bed or frame A'.

The slide $c^{14}$ is reciprocated by means of an arm or lever, $c'$, which has its fulcrum in a stand, $c^2$, which is also bolted to the frame of the heading-press. The oscillating lever $c'$ at its forward end is slotted, in order to receive an operating-pin which depends from the slide $c^{14}$ for that purpose, and its action thereon reciprocates the slide and the dog $c$.

The oscillating lever $c'$ is operated by means of a slide, C', which reciprocates in guides $c^{12}$, attached to the side of the press-bed A', the slide C' receiving the motion from a cam, No. 4, on main shaft C.

The fulcrum on which the arm $c'$ is pivoted and oscillates is made adjustable, the fulcrum-stand and the arm $c'$ both being slotted, to enable the fulcrum-pin $c^7$ to be advanced or retired, for the purpose of giving to the dog $c$ more or less reciprocating motion or play, as may be desired, such adjustment being governed by means of the set-screw or bolt $c^3$.

Two adjusting set-screws, $c^4$ and $c^5$, are arranged in the framing attached to the face of the heading-press frame, for the purpose of manipulating the dog $c$, screw $c^5$ causing the dog to seize upon the wire $z$ and to retain its hold while the slide $c^{14}$ moves forward, feeding the wire through the press and dies until the dog $c$ strikes the set-screw $c^4$, which at once releases it from its hold upon the wire, the slide then being retracted to again repeat the operation. These set-screws are readily adjusted so as to govern the action of the dog at the proper time in grasping and releasing the wire.

$c^6$ is a stop or clasping device controlled in its action by means of a spring, and arranged to permit the wire to pass freely through its fingers during its advance; but any tendency of the wire to retract is prevented by its fingers or jaws, the peculiar shape of which, by the action of the spring, enables it to seize upon the wire at the slightest retrograde movement.

The wire-straightening device consists of a series of small grooved wheels, $d$ $d'$, arranged in bearings in a suitable framing, $D^6$, attached to the face of the bed $A'$. Such wheels are also provided with adjustable pivots and set-screws $d^3$, so that they may be easily changed and adjusted for manipulating various sizes of wires. This arrangement, being a matter of common use, needs no detailed description herein.

The oscillating or tipping table and the arrangement of the various attachments for operating it are shown in Figs. 1, 8, 9, and 10, while the details of construction and operation are shown more plainly in Figs. 11 and 12.

$e$ is the table. Its position when ready for use is directly below the forming-dies, so that it will receive upon its surface the headed screw-blanks as they are delivered from the dies.

All of the operating parts are arranged in a frame, $e'$, which is bolted to the under side of the frame $A'$ of the press, and so applied thereto that the entire apparatus can be removed as a whole when so desired.

Referring particularly to Figs. 9, 11, and 12, $e^2$ is a shaft, which is sustained in position in a bearing, $e^3$, (see Fig. 8,) attached to the bed $A'$ of the press, and upon its forward end the table $e$ is mounted and supported in position.

$f$ and $f'$ are two longitudinal reciprocating pieces or slides, which are seated in a recess cut for that purpose in the top of the frames $e'$, the forward end of each being beveled in the shape of a wedge, as shown. They are retained in their seat in the frame $e'$ by means of a cap, $f^{21}$, applied over them at the rear end of the frame, and under which they slide. $f^3$ is another sliding piece arranged in the forward end of the frame $e'$, and has imparted to it a lateral reciprocating motion. It has a projecting base, which is inserted in a groove cut in the bed of the frame $e'$ for that purpose. Both its ends are beveled to correspond with the bevel on the ends of the slides $f$ and $f'$. It is provided centrally with an opening, $f^4$, through which a pin, $f^5$, is projected, this pin being attached to the rear end of the shaft $e^2$.

It is obvious that as the slide $f^3$ is moved laterally it necessarily moves the pin $f^5$, which communicates an oscillating motion to the shaft $e^2$, thereby causing the table $e$, attached thereto, to tip to the right or left, as the case may be.

The levers $f$ and $f'$ are alternately advanced and retracted, and by such movement the inclined faces $f^2$ press against the corresponding inclined faces of the slide $f^3$, moving it to the right and left alternately. Near the rear ends of slides $f$ $f'$ there are cut, on their inner sides, wedge-shaped recesses $f^6$, through which a pin, $f^7$, projects, and in which it alternately plays. A reciprocating slide, $f^8$, is adjusted in a groove in the guide-frame $f^{15}$, attached underneath and to the frame $e'$. Across this slide is cut a groove or slot, $f^{16}$, (see Fig. 12,) in which is inserted a slide, $f^{17}$, and to this slide the pin $f^7$ is permanently attached. A recess, $f^{18}$, is cut in the frame $e'$, in which to permit the pin to reciprocate, its width being sufficient to permit a lateral play also. The two slides $f$ $f'$ are connected together at their forward ends by means of an oscillating lever, $f^9$, which has its central pivot in, and it also operates in, a recess, $f^{19}$, cut in the bottom of the frame $e'$ for that purpose. Both ends of the lever $f^9$ are provided with slots, in which the pins $f^{20}$, attached to the slides $f$ $f'$, enter and play. This is for the purpose of communicating the motion imparted to one slide to the other. Thus, as the slide $f'$ advances, it, through the oscillating lever $f^9$, causes the slide $f$ to retract.

Referring to Figs. 9 and 12, the slide $f^8$ is given a forward motion by means of a shaft or pin, $f^{10}$, which projects down from oscillating arm $c'$ and strikes against the end of lever $f^8$. The arm $c'$ is the same lever that operates the wire-feeding dog $c$, as previously described. Its reverse or return motion is given by means of a spiral spring, $f^{11}$, which encircles the forward end of lever $f^8$, as shown in Figs. 8 and 12.

The extent of the retiring movement of lever $f^8$ is adjusted and controlled by means of the set-screw $f^{12}$, against which it rests until again moved forward. The position of the slides $f$ and $f'$ being as shown in Fig. 11, the shaft $f^8$ being advanced, the pin $f^7$ in the recess $f^6$ in the slide $f'$ causes such slide to move forward until the slide $f^3$ is forced over to the right, the slide $f$ retiring in unison with the forward movement of the slide $f'$.

As soon as the movement of lever $f^9$ is completed the spring $f^{11}$ returns it to its first position, and as the pin $f^7$ comes opposite the recess $f^6$ in the slide $f$ it is, by means of the pressure against it of the slide $f'$, forced into the recess $f^6$ in the slide $f$, and the first-described movement of the shaft $f^8$ again takes place, operating upon the slide $f$ in a similar manner, throwing the slide $f^3$ to the left. The pressure of the slides $f\,f'$ toward each other is obtained by means of two flat springs, $f^{25}$, inserted between the outer sides of the slides and the inner wall of the recess in frame $e'$, the forward ends of the springs being seated in the frame in order to secure them in position. The pin $f^7$ has lateral play in the two elongated recesses, being changed from one to the other, as described, by the shifting of the slide $f^{17}$, in which the pin is mounted in the groove in the shaft $f^8$.

The operation of the heading-press and its various attachments upon the wire, and the formation of a headed screw-blank therefrom, and the delivery of such blank to the screw-machine proper, are substantially as follows: The wire, of the proper gage, from which to form the desired screw-blank, is supplied from a coil or roll sustained upon a suitable stand of any approved form. The end of the wire is passed through the straightening devices, through the jaws of the retaining-clutch $c^6$, to the feeding-dog $c$. Motion being imparted to the machine, the dog $c$ seizes upon the wire, and, by a forward movement, draws the wire from the coil and through the straightening-rolls, and also sends it forward through an opening, $a^{19}$, in the frame A' of the press, and through a corresponding opening, $a^{18}$, in the die $a^{16}$, (see Figs. 1, 4, and 5,) to the position between the dies $a\,a'$, as shown in Fig. 5, its forward end resting against the stop $b$. The die $a'$ is then moved laterally upon the wire $z$, cutting it off at the face of the die $a^{16}$, that portion of the wire severed entering the recess $a^9$ therein, and is carried, with the die $a'$, until it closes up against the stationary die $a$, where the wire is secured in the recess $a^9$ in both dies, its rear end resting against the face of the die $a^{16}$. During this movement of the die $a'$ the stop $b$ is dropped down below the line of movement of the heading-punch $a^4$. At the completion of the movement of the die $a'$, as described, the heading die or punch $a^4$ is advanced upon the end of the wire projecting beyond the face of the dies $a\,a'$. This movement of the punch upsets the end of the wire $z$ into the conical recess $a^3$, formed in the face of such dies. The punch is then withdrawn to its first position, and the die $a'$ retracted by means of the slide $a^2$ until it reaches its first-described position, the opening of the dies $a\,a'$ releasing the headed blank, which drops down upon the oscillating table below. The stop $b$ in the meantime being raised to its first position, the wire $z$ is then again fed forward by the means described, and another blank formed thereupon and therefrom.

The extent of the movement of the feeding-dog $c$ has, of course, been previously adjusted, as well as the position of the stop-gage $b$, in order that the proper length of wire from which to form the blank is assured. As the blank falls from the dies it is received upon the oscillating table $e$, which directs it (to the right or left, as the case may be) into the inclined slotted conveying-trough F, which is arranged for that purpose, and secured to the frame A' of the press on either or both sides thereof.

The position of the oscillating table $e$ is changed at the same time as the wire $z$ is fed forward by the feeding-dog $c$, both being actuated by means of the oscillating arm $e'$, controlled by the action of the slide C', as before described.

The conveying-trough F, which receives the headed blanks from the heading-press, being slotted in its base, permits the body of the blank to fall through the slot, the heads of the blanks serving to prevent their escape therefrom, while they pass down the incline by their own gravity to the end of the trough, from which they are fed, one by one, to the action of the screw-machine proper. This form of carrying or conveying trough being a common device in screw-machines, no complete description thereof is needed herein. In case the machine is divided into two separate machines—that is, a heading-machine and a detached screw-machine—the inclined trough, as herein shown, may be used to convey the headed blanks from a hopper to the screw-machine, both being attached thereto, in which case its operation in regard to the blanks is precisely the same as before described.

The screw-machine proper, as shown in the drawings, will be first described as applied to the production of screws provided on their heads with an angular cavity in addition to the usual slot or nick. The various modifications of the machine by means of which it may be adapted to the production of various other styles of screws will afterward be fully set forth and pointed out.

The first operation to which the headed screw-blank is subjected is the process of shaving the conical head thereof in order to remove any roughness or burr left thereon by the dies when the head was formed, and the process of drilling a round hole in the center of the head, which hole is, at another stage in the manufacture of the screw, formed into an angular cavity.

The machine has three main shafts, D, D', and D², which are geared together, as shown in Fig. 2, so that all operate in the same time and in unison. They are connected, by suitable gearing, to the driving-shaft C of the heading-press, so that the combined machines operate together; or the two machines may be driven by means of separate driving-belts from one counter-shaft arranged above or below the machine, so that the speed of both the machines will be the same; or the heading-press lating lever, I, the forward end of which is forked or slotted, (see Fig. 9,) into which slot is entered a pin, $i^{29}$, which projects from the slide $i^2$. This lever I has an adjusting fulcrum-stand, I', attached to the bed A of the machine, these adjusting arrangements being such that the extent of motion of the guide $i'$ may be controlled.

The lever I is operated by means of the rear end being forked or slotted, which fork or slot encircles a pin in a slide, $I^2$, which slide reciprocates in grooves or ways in a stand, $I^3$, attached to the bed of the machine, the slide $I^2$ receiving its motion by means of a pin, $I^4$, which projects to the rear from the slide and enters an operating-groove cut in the cam 7 on main shaft D.

The object of the two guides $i$ $i'$ is to receive, in the seats formed in their apices, the screw-blank when it is delivered from the mouth of the conveying-trough F, the fixed guide $i$ holding the point of the blank, and the sliding guide-rest $i'$ holding its head, as is shown in Fig. $10\frac{1}{2}$, and as the screw-blank is pushed forward into the clamp $h^2$ by the advance of the drill, as will presently be more fully described, the guide-rest $i'$ moves forward in unison therewith. After the head of the blank is drilled and shaved, and the blank is released from the clasp of the clamp $h^2$, the movable guide-rest $i'$ is then retracted, drawing the blank from the clamp until it is returned to its first-named position, and supported in the two guides in position to be grasped by the transferring device, and carried thereby to the next operation.

The carrying-trough F is V-shaped in form, its base being cut away or slotted, so that the bodies of the screw-blanks will fall through and only be retained by their conical heads. In this position they, by their own weight, slide down the inclined trough until they reach its lower end, where they gradually assume a horizontal position, as shown best in Fig. $10\frac{1}{2}$, a short arm, $F^{44}$, also slotted and attached to the trough F, receiving and guiding the ends, in which position the blanks are ready for delivery to the drilling and shaving apparatus, which delivery is accomplished as follows: The screw-blanks are picked from the end of the trough F by means of two fingers, $k$ and $k'$. As the blanks descend the trough they rest successively upon the top of finger $k$, the other finger, $k'$, being in a corresponding position below it. Finger $k$ is then withdrawn, which action permits the column of screw-blanks to fall until the first blank rests upon the finger $k'$. Finger $k$ is then advanced and enters in between the blank resting upon finger $k'$ and the blank in the column directly above it, thus sustaining the entire column of blanks, as in the first instance. Finger $k'$ is then withdrawn, and the single blank released thereby at once drops into the seats formed in the tops of the guide-rests $i$ and $i'$, provided to receive it, as previously described, and as will be readily understood by referring to Fig. $10\frac{1}{2}$. This operation, as repeated, selects and releases the blanks from the trough one by one. The finger $k$ is operated by means of levers $k^2$ and $k^3$, the last-named lever being moved by means of a direct-acting cam, No. 9, on the main shaft D, finger $k'$ being operated by means of levers $k^4$ and $k^5$, the last-named lever being operated by cam 8 on the main shaft D. Their reverse motion is obtained by means of the springs $k^6$, which operate upon pins attached to the levers $k^3$ and $k^5$, which pins project up through a slot in the caps of the guiding-stand $k^9$.

$l$ is the cutter or cutters by means of which the face and rear of the conical head of the blank are shaved. These cutters are shaped to conform to the shape of the head, and are mounted in the forward end of a slotted slide, $l'$, which reciprocates in bearings or guides in the stands $l^2$ and $l^3$, bolted to the bed of the machine. This arm or lever $l'$ is reciprocated by means of a cam, No. 6, on the main shaft D, as shown in Fig. 2. The cutters are retained in position in the arm $l'$ by means of a clamping device of the form usually adopted for such purposes.

The operation of the blank-separating, drilling, and head-shaving apparatus is substantially as follows: The headed screw-blanks, being delivered from the heading-press or hopper by means of the conveying-trough F, are selected from the column in the trough by means of the fingers $k$ $k'$, and dropped into position in the seats $i^4$ in the guide-rests $i$ $i'$, as previously described. The shaft $g'$, carrying the drill $g^4$, is then advanced while rotating in unison with the sleeve-shaft $g$, and presses the point of the drill against the center of the head of the blank. As the drill continues to advance, the guide-rest $i$ is at the same time advanced in unison therewith by means of the cam and levers, as before described. The advance of the drill being thus continued forces the blank its entire length into the clamp $h^2$, the head of the blank only projecting. The jaws $h^{12}$ of the clamp are then closed down upon the blank, holding it firmly while it is rotated with the clamp.

As previously stated, the drill and the clamp holding the screw-blank are revolved in contrary directions—the drill to the left, and the clamp, with the blank, to the right. The advance of the drill is continued, and it is thereby entered into the center of the head of the blank to such a depth as it may be gaged and adjusted to drill. The extent of its movement being reached, it is then retracted to its normal position. The advance of the guide-rest $i'$ is checked when it reaches a point near the face of the clamp $h^2$, and remains at rest during the process of drilling. The drill being retired, the shaving-cutters $l$ are advanced to their work, and shave the head and face of the blank-head. This done, they are retired to their first position.

The rotating of the two shafts in opposite directions, of course, increases the speed at the point of action of the drill upon the screw-blank, while the operation of shaving is acmay be driven at a greater rate of speed than the screw-machine without interfering with the operations of the latter.

The plan views of the drilling and shaving devices are shown best in Figs. 2 and 9, and the elevations in Figs. 8, 10, 10½, and 14, and to these illustrations attention is particularly directed.

The drilling apparatus consists of two shafts mounted in suitable bearings in stands bolted to the bed A of the machine, and revolving in opposite directions, one shaft being provided with a clutch, which receives and securely holds the headed screw-blank while its head is being drilled and shaved, and is rotated to the right, while the other shaft, carrying the drill, revolves to the left.

G is a stand bolted to the bed A of the machine, and it has two upwardly-projecting arms, in which are formed the bearings or boxes in which the sleeve-shaft $g$ is mounted. This shaft $g$ is made in the form of a sleeve, for the purpose of permitting a second shaft, $g'$, to be passed through it, this last-named shaft being provided with a longitudinal slot, $g^2$, in its periphery, in which slot a tongue attached to the sleeve-shaft $g$, on its interior, plays, thus permitting the shaft $g'$ to be freely reciprocated through the shaft $g$ while both of the shafts are revolving in unison.

The sleeve-shaft $g$ is driven by a pulley, $G^3$, attached to it between the two arms of the stand, and communicating its motion to the internal shaft, $g'$, by means of the tongue which enters the groove or slot $g^2$ therein. This shaft $g'$, at its forward end, is provided with a clamping device, $g^3$, which receives and carries a drill, $g^4$.

To the rear end of the shaft $g'$ is attached a ring, $g^5$, which is provided centrally with an annular slot, in which the forked arms $g^6$ of lever $g^7$ enter and play, permitting the ring to revolve with the shaft, but at the same time retaining control thereof. This lever $g^7$ is provided with an adjusting-slot and fulcrum-pin, $g^8$, its fulcrum-stand $G'$ also being made adjustable upon the bed A, for the purpose of giving more or less reciprocating motion to the shaft $g'$, in order that the depth of the hole to be drilled in the head of the blank may be accurately gaged without any change being necessitated in the cams or levers or connections, no matter what length or size of screw-blank is being manipulated.

The oscillating lever $g^7$ is operated by means of a slide, $g^9$, which is mounted in grooved bearings in the face of the stand $G^2$, which is bolted to the bed A of the machine, the end of the lever being forked or provided with a slot, which is applied about a pin inserted in the slide $g^9$. The slide $g^9$ is moved laterally to the right and left by means of a cam, 10, on the main shaft D, into the operating-groove of which a pin, $g^{10}$, projects from the face of the slide $g^9$ in the stand $G^2$, which arrangement is shown distinctly in Figs. 2 and 14.

The sleeve-shaft $g$ is, between the arms of the stand G, provided with a pulley, $G^3$, which is driven by means of a belt passing through an opening in the bed A to a pulley on an auxiliary driving-shaft arranged in bearings in the framing or legs of the machine below the bed, (see Fig. 3,) the motion imparted being to the left.

H is a stand bolted to the bed A of the machine, and provided with two upright arms, $h\ h$, in which are formed bearings, in which a shaft, $h'$, is mounted. This shaft $h'$, between the arms $h\ h$, is provided with a small driving-pulley, $H'$, which is rotated to the right by means of a belt which passes through the bed A to a large driving-pulley arranged on a shaft in the frame B below the bed A. At its forward end it is provided with a clutch, $h^2$, which is arranged to receive the full length of the body of the screw-blank, as is distinctly shown in Fig. 10½, leaving the conical head thereof projecting beyond the face of the clutch. This clutch is provided with two or more clamping-jaws, $h^{12}$, which are closed down upon the blank, after it is entered therein, at the proper time, by means of a sliding ring, $h^3$, which encircles the shaft $h'$ and the clamping-jaws, and is reciprocated thereon, its action closing the jaws $h^{12}$ by its forward movement and releasing them by its retreat.

In the latter movement the jaws, when released, are opened by means of suitable springs seated in the body of the clutch beneath the jaws; or the top of the clamps $h^{12}$ may be in the form of a bow or crescent, and pivoted in the center, so that the pressure of the ring $h^3$ on their rear ends will throw them open at the front. This sliding ring is provided centrally with an annular slot, into which pins $h^4$ project from the forked arms $h^5$ on the end of a lever, $H^2$, this arrangement permitting the ring $h^3$ to rotate and reciprocate at the same time without interfering with the operating-lever. The lever $H^2$ has an adjustable fulcrum-stand, $H^3$, provided with an adjusting slot and screw, $h^6$, so that the extent of the movement of the clamping-ring $h^3$ is adjusted to such points as may be necessary.

The lever $H^2$ is given its motion from a slide, $h^7$, moving in bearings in a stand, $H^4$, the slide $h^7$ being reciprocated by means of a pin, $h^{10}$, projecting from its rear face and entering the operating-groove in cam 5 on shaft D, the rear end of the shaft or lever $H^2$ being slotted or forked and encircling a pin attached to the front of the slide $h^7$.

$i$ is a stationary guide or rest bolted to the end of the arm $h^{44}$, attached to the stand H, its top $i^4$ being cut away or notched (see Fig. 8) to form a seat for the screw-blank. $i'$ is a movable guide and rest, which is attached to a slide, $i^2$, which is reciprocated in a groove or way formed in a frame or stand, $i^3$, which is attached to the end of the projecting arm of stand G. Its top is also cut away or notched, as in case of the fixed guide-rest $i$, to form a seat for the screw-blank. The slide $i^2$ receives its reciprocating motion by means of an oscilcomplished at one-half the rate of speed of the drilling process. As soon as the shaving is completed and the cutters shall have retired, the grasp of the clamps $h^{12}$ is released from the screw-blank. The sliding guide-rest $i'$ is then retracted, and, as it presses against the inner face of the head, thereby draws the screw-blank from the clamp $h^2$, it sliding through the seat in the top of the guide-rest $i$ until it is retired to the first position, as when it was taken from the carrying-trough F, when it again rests in the seats in guides $i$ $i'$ until seized upon by the transferring apparatus, and thereby removed from the guides and conveyed by the transferrer to the next operation in the machine. As soon as the drilled and shaved blank is so removed another blank is taken from the carrying-trough, and the same operations repeated thereon, as described.

The next important element in the combination of devices in this machine is the transferring apparatus, by means of which the screw-blanks are taken from the drilling and shaving apparatus and carried to the various other operations necessary for the manipulation thereof into a finished screw. This device consists, primarily, of a series of griping jaws or fingers, which are mounted in a suitable frame and guides. The jaws, being opened, are given an upward motion, in which movement they grasp the blanks and raise them from the guide-rests, also from the various seats in the exterior framing in which the jaws are operated, holding them firmly, the upward movement being continued until the blanks are raised to a position above the top of the frames. A motion to the left is then given a specified distance, then a falling motion, which carries the blanks into the seats in the frames, where they are released from the jaws, the jaws continuing to fall until they are below the line of blanks, when they are moved to the right until their first position is reached. By this means the blanks are advanced step by step from one seat to the next to the various operations until they are finally discharged as finished screws.

The construction and operation of this transferring apparatus are fully illustrated as follows:

In Fig. 2 its position in relation to the other parts of the machine is shown, Fig. 15 being an enlarged detached plan view, showing the position of the operating-levers. Fig. 16 is a longitudinal elevation, partly in section; and Figs. 17 and 18 are cross-sections thereof, taken on lines 291 292. Fig. 19 is an end view of an elevation, partly in section, showing the position of the apparatus and operating-levers on the bed of the machine. Fig. 20 is an enlarged detached sectional view of the transferring devices, showing the details of its interior construction and operation. Figs. 21 and 22 are views in detail of the griping-jaws, and Fig. 23 a cross-section of a single griping-jaw and its operating-frame.

The frame or stand in which the operating parts are secured and operated is divided into two sections, J and K, both being bolted to the bed A of the machine. Upon the exterior of these frames J and K are attached auxiliary frames $m$ $m'$, (see Figs. 17 and 18,) which frames have a longitudinal recess in their tops the entire length thereof. They are also provided transversely with a series of seats, $m^3$, in which the screw-blanks rest after they are released by the grasping-jaws. Centrally in between these stands J and K and frames $m$ $m'$ the frames carrying the griping-jaws are adjusted and operated. They consist of a reciprocating frame, M, in which the jaws are mounted, and of a base-frame, M', which receives a rising-and-falling motion only. The sliding frame M is recessed centrally, and provided in such recesses, its entire length, with a sliding lever, $m^4$.

The griping-jaws $m^5$ are divided into two sections, $m^6$ $m^7$, the leg of section $m^7$ being inserted and securely fastened into the top of the frame M, while the leg of section $m^6$ is inserted into a recess, $m^9$, formed in the top of the slide $m^4$. This recess $m^9$ is large enough to permit the leg $m^6$ to have a little play therein. (See Fig. 22, where the face of the frame M is removed to show the arrangement.)

It is obvious that by moving the slide $m^4$ (as in Fig. 20) to the right its pressure against the leg $m^6$ will close the jaws, and that a movement to the left will open them.

A spiral spring, $m^8$, is inserted between the base of the legs $m^6$ $m^7$, the pressure of which serves to always keep them at a tension, in order to allow the jaws to adjust themselves to the varying sizes of wire that they may grasp, the recess $m^9$ in the sliding lever permitting sufficient adjusting play to the end of the lever $m^6$ for that purpose. It will thus be seen that the jaws will hold the wire blanks by the action of the springs $m^8$ after the operating-levers have ceased to govern the leg $m^6$.

The frame M rests and slides upon the base-frame M', and is retained in position thereon by means of a guide, $m^{10}$, the base of which is entered into a recess, $m^{11}$, formed in the side of frame M'. (See Figs. 16 and 20.)

The forward end of the frame M' is dropped, forming a depression, M³, therein, which has a corresponding recess in the bed A of the machine. This depression M³ is formed for the purpose of permitting the entry of the operating-lever and the operating-pin $m^{12}$, which depends from the base of the frame M. The frame M' also has attached to its base two shafts, M⁴, which pass through the bed A of the machine to the operating-levers arranged below the bed. (See Figs. 16 and 20.)

In the rear frame or casing, J, are cut recesses M⁵ and M⁶, in the center of which a projecting stud and guide, $m^{13}$, is formed or attached. In the right-hand end of the wall of the recess M⁵ is cut a perpendicular slot, through which a pin is passed, having on its forward end a friction-roll, $m^{14}$, the rear end thereof, on the rear exterior of casing J, having an adjusting-nut, so that the position of the pin and its friction-roll may be adjusted in the slot at any desired point. A similarly-arranged pin and friction-roll, $m^{15}$, is also arranged in the recess $M^6$ on the left. The slide $m^4$, which governs the leg $m^6$ of the jaws $m^5$, has two square pins, $m^{16}$ $m^{17}$, attached to its rear, pin $m^{16}$ projecting through an elongated slot, $m^{18}$, in the casing of the frame M and into the recess $M^5$. A corresponding pin, $m^{17}$, projects through a similar slot entering into the recess $M^6$. The frame M being moved to the right by the lever which acts on the pin $m^{12}$, the pin $m^{16}$ passes under stud $m^{13}$ until it touches the friction-roll $m^{14}$, the pressure exerted by the lever and pin $m^{16}$ against the roll $m^{14}$ allowing the outside casing to still move forward far enough to open the jaws $m^5$, the inside slide-lever, $m^4$, and the legs $m^6$ remaining stationary. The jaws being open, the under frame, M', is given an upward motion, which carries the frame M with it, the pin $m^{16}$ riding on the face of the friction-roll $m^{14}$ until it clears it, when the jaws will close, seizing the blanks, if any are presented, by the action of the springs $m^8$. The frames m m' are then moved to the left until the jaws $m^5$ are on a line with the seats $m^3$ in the frames m, when they drop down into their first position. During this movement of the frames and the action for opening the jaws, as just described, the pin $m^{17}$ is also moved forward under the friction-roll $m^{15}$ and stud $m^{13}$ in the recess $M^6$, and rises with the frame, and is moved to the left until it touches the friction-roll $m^{15}$, riding over it but not entirely clearing it, when it is dropped down, during which movement it presses against the face of the roll. This pressure throws the lever M far enough to the left to slightly open the jaws $m^5$, which are thus kept open until they drop below the frames m and m', leaving in the seats $m^3$ any screw-blanks, 50, that may have been carried in the jaws. (See Fig. 20.)

As the pin $m^{17}$ passes down from the face of the roll $m^{15}$ the normal position of the various parts is resumed, being that as first described. The reciprocating movements are imparted to the frame M by means of an oscillating lever, $M^8$, which has an adjusting fulcrum-slot, $m^{20}$, and an adjustable fulcrum-stand, $m^{21}$, attached to the bed A of the machine, this for the purpose of permitting the accurate adjustment of the extent of the motion to be given to the griping-jaws $m^5$. The forward end of this lever is forked or slotted, so as to inclose or encircle the pin $m^{12}$, by means of which the frame M is reciprocated. The lever enters a slot cut in the exterior casing, K, for that purpose. Motion is imparted to this lever $M^8$ by means of a cam, 12, on the main shaft D', which operates upon its rear end, as shown in Figs. 2 and 19.

The rising-and-falling motion of the frame M', which carries with it the frame M, is accomplished by means of two levers, $M^9$, which are arranged below the bed of the machine, the forward ends of which are connected with the pins $M^4$, which project down through the bed A for that purpose. They have a central bearing in two standards, $M^{10}$, attached to the bed A, and receive motion by means of a cam, 11, on the main shaft D', which operates upon a short lever, $M^{12}$, passing through the bed A and attached to the rear end of the lever $M^9$, as shown in Fig. 19.

The operation of the transferring apparatus is substantially as follows: The griping-jaws being moved to the right by the means described, the casing of frame M and $m^4$ is projected from the casing J and K to the right until the first nipping-jaw is in position directly below the headed screw-blank, that is held in position in the guide-rests i and i', as previously set forth. (See Fig. 10½.) When this position is reached the jaws are all opened at once, in the manner before explained. The rising of all the jaws in unison then takes place, the first jaw closing upon and grasping the screw-blank held in the rests i and i'. The motion to the left is then imparted to the series of jaws until the first jaw, carrying the first screw-blank, is directly over the first seat, $m^3$, in the frames m and m'. The falling motion is then given them, and as the blank settles in the seat $m^3$ the jaw releases its gripe upon the blank, the dropping motion of the jaws being continued until the apices of the jaws are below the line of screw-blanks in the seats $m^3$. The movement of the jaws to the right then takes place until the first jaw is again in position to grasp another blank from the guide-rests i and i'. In the operation of this transferrer the griping-jaws take hold of the screw-blanks near their center, the head of the blanks projecting beyond the face of the framing m', and its point to the rear of the face of the framing m. (See Figs. 26 and 27.)

In the case of a short screw-blank being manipulated, its head would take the same position as in case of the longer screw-blanks, its point only resting partially in the seats in the rear framing, m.

It will be understood that as this operation progresses the blanks taken from the guide-rests i and i' by the first griping-jaw, and seated in the first seat, are, by the other jaws, transferred from one seat to the other in rotation until the blank has been presented to the action of the other devices in the machine, the operation of the various jaws being the same as described in the case of the first one, the entire series being operated in the same time and by the same means.

The process of manipulating the screw-blanks as they are delivered by the transferrer to the various operations and devices, and their redelivery to the transferrer for transmission to the next succeeding operation, will be fully detailed in the description of each separate device.

The first operation in the manipulation of the screw-blanks after they are delivered from the drilling and shaving devices to the transferrer is the process of punching the round hole, previously drilled into the center of the conical head of the blank, with an angular punch, for the purpose of forming the round hole into one that is angular in form, but preferably square.

O is a small power-press, which is bolted to the bed A of the machine. It is provided with a shaft, $o$, which at its base carries a die, $o'$, which has cut transversely in its face a cavity corresponding in shape to one-half the diameter of the screw-blank. A stand, O', is attached to the bed A of the machine directly under the die $o'$, and has seated in its top a small die, which also has cut into its face a recess like that in the upper die, $o'$, the two recesses in the two dies forming a cavity of the shape of the screw-blanks. This press is set into position over the transferrer, a large opening or space, $O^2$, being left between the body of the press and the stand O', through which the transferrer is operated, (see Fig. 19,) a similar arrangement also being shown in case of power-press P in Fig. 25, the exterior framing, $m'$, attached to the frame K of the transferring apparatus, being cut away to permit the entry of the stand O', while the rear frames, $m$ and J, are overreached by the frame or stand of the press O. This arrangement will be more fully described in connection with the similar press P, as shown in Figs. 25, 26, and 27.

The position of the stand in relation to the transferrer is shown best in Figs. 2 and 16.

The office of this power-press is to seize upon the screw-blanks and to clamp them rigidly in between its dies $o'$ $o^2$, and to hold them securely and immovably after the transferring-jaws have released their hold and deposited the blanks in the seats prepared for them. The dies $o'$ $o^2$ thus take the place of the seats, and hold the blanks with the head presented to the action of the tools, as shown distinctly in Fig. 24.

The angular punch $n$, which is to be entered into the round hole in the head of the blank, is inserted in the end of a reciprocating slide, $n'$, which is operated in guides formed in the stands $n^2$ $n^3$, which are bolted to the bed A of the machine. This slide $n'$ receives its reciprocating motion by means of a cam, 13, on the main shaft D'. The advance movement of this slide forces the punch into the round hole drilled into the head of the screw-blank, displacing whatever metal resists its entry, and forcing it to the bottom of the hole, thereby transforming the round hole into a cavity having the shape of the angular punch, be it square, octagonal, hexagonal, or of any other angular form.

The apparatus for cutting the slot or nick across the face of the screw-blank consists of a mill or saw, $n^7$, which is mounted on the end of a shaft, $n^6$, projecting from the forward end of a swinging frame, $N^3$. Said shaft is mounted in suitable bearings, and is rapidly rotated by means of a train of gearing, $o^5$ to $o^{15}$, the last-named gear being the driving-gear, attached to the main shaft D' of the machine.

Gears $o^5$ to $o^{13}$ are mounted on shafts operating in bearings formed in the swinging frame $N^3$, whose pivot or swinging point at its rear end is fixed in the top of a stand, $N^4$, attached to the bed A of the machine. The intermediate idling-gear, $o^{14}$, which has its shaft mounted in a slot in the arm $n^9$, which projects from the stand $N^4$, communicates motion from gear $o^{15}$ to the gear $o^{13}$. This arrangement permits the arm $N^{13}$, with its train of gears and the saw $n^7$, mounted on a shaft at its forward end, to be raised or lowered while the gearing is in motion.

It is also obvious that if the idling-gear $o^{14}$ is dropped to the base of the slot in arm $n^9$ it will not be acted upon by the gear $o^{15}$, and the entire train of gearing and the saw will, therefore, remain silent.

The swinging frame $N^3$, at its forward end, is connected to a link, $N^5$, which passes down through an opening in the bed A, and is attached to the forward end of a rocking lever, $N^6$, such lever being provided with a fulcrum in a stand, $N^7$, attached beneath and to the bed of the machine. It receives its rocking motion by means of a connecting-link, $N^8$, attached to its rear end, and passed up through the bed A to the action of cam 15 on the main shaft D'.

The operation of the punching and slotting devices is substantially as follows: The screw-blank 50, having been delivered by the transferring apparatus into the grasping-dies $o$ and $o'$ of the press O, is rigidly held therein with its conical head projecting, as shown in Fig. 24. The punch $n$ is then, by the means described, forced into the round hole previously drilled into the center of the head of the screw-blank, giving it the angular shape desired. The punch, after performing its work, is then retracted to its first position, as in Fig. 24, where it remains at rest during the slotting operation. The swinging frame $N^3$ is then carried upward by means of the levers, as described, carrying the mill or saw $n^7$ across the face of the head of the screw-blank, cutting therein a narrow slot. This done, the frame and saw are dropped down to their first position. The press O then releases its grasp upon the screw-blank, the jaws of the transferrer rise, seize upon the blank, and carry it to the left to the next seat-rest, $m^3$, in frames $m$ $m'$ of the transferring apparatus, and by the same operation another blank at the same time being carried into the dies $o$ $o'$ of the press O, upon which the same operations are repeated.

It is plainly apparent that in case it is desired to manufacture a screw of the ordinary character, having the slot or nick only in its head, such a screw-head can be made by simply omitting the drill from the drilling apparatus and the punch from the punching-lever, the slotting-saw only, in such cases, operating upon the head of the screw-blank; or, in case it is desired to provide the screw-head with an angular cavity only, omitting the slot or nick, the slotting apparatus is simply disconnected, so that the swinging frame does not rise, the gearing also being disengaged from the driving-gear on the main shaft. If a round hole only is desired in the head of the screw-blank, the punch and the slotting devices are both disconnected, the other operations all taking place as described.

The next operation in the manipulation of the screw-blank is the process of reshaving the face and rear of the conical head of the blank, for the purpose of removing any burr or roughness left upon the surface by the action of the punch and slotting-saw, the arrangement for that purpose being as follows: P is a small power-press arranged upon the bed of the machine. It is provided with clamping dies or jaws $p\ p'$, arranged to seize upon the screw-blank 50 as it is delivered to the dies of the press by the transferring apparatus, holding it securely during the action of the shaving-tool thereon. The lower die or jaw, $p'$, is attached to the top of a stand, $p^{10}$, which is bolted to the bed A of the machine, the upper die, $p$, being affixed to the end of the plunger $p^2$, which is raised and lowered by means of a lever, $p^{11}$, which is operated by a lever-arm, P', having a fulcrum in bearings in stand $P^2$, bolted to the bed of the machine, the lever P' being actuated by means of the cam 16 on main shaft D'.

The frames $m'$ and K of the transferring apparatus are cut away to admit the entry of stand $p^{10}$, as shown in dotted lines in Fig. 25, also in Figs. 15, 26, and 27, the rear part of the press overreaching the transferring apparatus, as plainly shown in Fig. 25, that part of the press-stand $p^{10}$ and its die $p'$ taking the place of the frame $m'$ and its seats $m^3$. The dies $p\ p'$ have a groove cut in their faces to correspond with the diameter of the body of the screw-blank, so that when they are closed down upon it the blank is securely held in position for the application of the reshaving and milling tools.

$P^5$ is a sleeve-shaft mounted in bearings $P^6$, which are securely bolted to the bed A of the machine. This shaft $P^5$ is provided with a driving-pulley, $P^7$, mounted thereon in between the two bearings $P^6$, the pulley receiving its rotary motion by means of a connecting-belt, $p^4$, communicating power from a driving-shaft arranged in the framing of the machine below the bed A.

A shaft, $P^8$, is inserted in the sleeve-shaft $P^5$ and reciprocates therein. It is provided with a tongue, $p^{12}$, which enters a longitudinal slot, $p^{13}$, in the sleeve-shaft, and by this means a rotary motion, in unison with that of the shaft $P^5$, is communicated to the shaft $P^8$, while its longitudinal reciprocating movement in the sleeve-shaft $P^5$ is permitted.

To the rear end of the shaft $P^8$, which projects from the sleeve-shaft to the rear of the bearing $P^6$, is attached a ring, $p^{14}$, provided on its exterior with an annular slot, the ring $p^{14}$ being adjusted to any desired position on the shaft by means of the screw-thread on the shaft $P^8$, its interior being provided with a corresponding screw-thread for that purpose.

$p^{15}$ is a short lever, the forward end of which is forked, each fork having a pin which enters the annular slot in the ring $p^{14}$, the rear end of the lever being secured to the forward end of the slide $p^{16}$, which is secured in ways formed in the face of the stand $P^9$, which is bolted to the bed of the machine.

A pin, $p^{17}$, projects from the rear end of the slide $p^{16}$ and enters a groove in the cam 17, by means of which the slide $p^{16}$ is reciprocated, which motion is communicated to the shaft $P^8$, the pins in the end of the forks of the lever $P^{15}$ playing in the groove in the ring $p^{14}$, permitting it to rotate while it is being reciprocated.

The forward end of the sleeve-shaft $P^5$ is enlarged, as shown in Figs. 25, 26, 27, and 28, and to the outer edge of such enlarged part is attached a slotted stud, for the purposes as will presently be fully described.

In the forward end of the shaft $P^8$ is inserted a milling-tool, $P^{11}$, the office of which is to mill off any burr or roughness from the face of the screw-blank raised by the action of the saw when cutting the slot.

Near the forward end of the shaft $P^8$ is attached a slotted fulcrum-stud, R, in which is inserted a rocking arm, R', which has an arm, $R^2$, projecting to its rear, which passes through the slot in the stud $r$ on the shaft $P^5$. (See Figs. 26 and 27.) At the forward end of this arm R' is cut an inclined recess, into which is seated the cutter $R^3$, and secured therein by any approved means. These attachments, of course, revolve with the shafts to which they are attached.

The mill $P^{11}$ has cut into it a small recess, $R^4$, to permit the entry therein of a portion of the cutter $R^3$ when it is tipped forward to the position as shown in Fig. 27. The office of this cutter $R^3$ is to remove the burr left on the rear face of the screw-blank head by the saw when it is cutting the slot.

The operation of this portion of the machine is as follows: The screw-blank being held in the dies $p\ p'$ of the press P, (being delivered thereto by the transferring apparatus, as previously described,) as shown in Figs. 26 and 27, the mill and cutting-tool being in their normal position, as in Fig. 26, the shaft $P^8$ is advanced, by the means described, until the mill $P^{11}$ acts upon the face of the screw-blank, removing all imperfections therefrom. The advancing of this shaft, of course, carries with it the arm R' and its attached cutter, and as the movement forward progresses the rear, $R^2$, of the rocking arm is drawn through the slot in the stud $r$, and, owing to the inclined form thereof, is tilted forward until it reaches the position in relation to the mill $P^{11}$ and the head of the screw-blank as shown in Fig. 27. At this point the cutting-edge of the cutter $R^3$ is applied to the conical rear of the blank-head, and in its revolution about the same removes any burr projecting from the ends of the slot. The shaft $P^8$, after a single revolution, is withdrawn to its first position. The press P then releases the screw-blank from its grasping-dies, the jaws of the transferring apparatus rise, seize upon the blank, and carry it to the left one seat, and thence, step by step, until it is delivered to the action of the screw-threading apparatus.

It will thus be seen that a series of screw-blanks are being continuously transferred from the heading apparatus, through the various operations, until they are finally discharged in the desired form of finished screws, and that the various operations are all being performed simultaneously, although the apparatus performing each distinct operation is entirely independent of the others, and the various parts of the machine for the several operations might each be designated as a separate machine and used as such.

The screw-threading apparatus is made double in order that two screw-blanks may be manipulated at the same time, and thus increase the capacity of the threading apparatus up to that obtained in and by the preceding operations. This portion of the machine is also made adjustable in every respect necessary to adapt it to the cutting of screw-blanks of various lengths. Its construction is also such that, if so desired, it can be entirely detached from the rest of the machine, and used as a detached machine for threading screw-blanks independently, in which case the blanks could be fed to it from a hopper by any approved means, such as are now used in such cases.

In studying this part of the machine attention is particularly directed to Figs. 2 and 29 to 36, both inclusive. In Fig. 2 its relations to the other parts of the machine, the driving-cams, and operating-shafts are best shown, while the other figures are enlarged in order to show fully the details of construction and operation. The various screw-threading devices calling for different rates of speed from the other parts of the machine, the variations in motion from that of the main shafts D, D', and $D^2$ are obtained by means of the auxiliary shaft S, arranged at the rear of the shaft D', and shaft S', arranged at the rear of main shaft $D^2$, both hung and operating in suitable bearings in arms $s\ s'$, attached to and projecting from the bed A of the machine, the decreased speed of shaft S from that of the main shaft D' being obtained by means of gear $s^2$ on the main shaft D' and gear $s^3$ on shaft S, the movements of gear $s^2$ being transmitted, by an intermediate gear, $s^4$, to gear $s^3$, (see Figs. 33, 34, and 2,) the auxiliary shaft S' receiving its decreased speed by means of gear $s^5$, meshing into intermediate gear, $s^{51}$, which, in turn, meshes into gear $s^6$ on the shaft S'. (See Fig. 36.)

$S^2$ is the bed to which the stands, frames, and operating parts of the screw-threader are attached, this auxiliary bed being securely bolted in position upon the main bed A of the machine.

$S^3$ is a bifurcated, and $S^4$ a single, stand attached to the bed $S^2$, and in bearings in these stands are mounted the shafts which carry the various operating parts of the apparatus. $S^5$ are two auxiliary stands, also attached to the bed $S^2$, and serve as the bearings for the forward ends of the shafts which carry the mechanism for holding and rotating the screw-blanks during the operation of thread-cutting, the rear ends of such shafts being mounted in the stand $S^4$.

W is a stand bolted to the bed $S^2$ and overreaching the stands $S^3$ and other parts of the apparatus, as shown in Fig. 30. In this stand are arranged the operating parts that control the devices for guiding the screw-cutters, so as to give the proper taper and gimlet-point to the screw when finished.

T are two sleeve-shafts, which carry the devices for receiving the screw-blank from the transferrer, grasping its conical head, holding it firmly, and revolving with it during the operation of cutting the screw-thread thereupon. These shafts are mounted in bearings in the stands $S^4$ and $S^5$, and receive their rotary motion by means of the gears $t$, (see Figs. 33 and 36,) attached thereto, such gears receiving their impulse by means of intermediate gears, $s^7$ to $s^{16}$, such train of gearing being operated by means of gear $s^{15}$ on the main shaft $D^2$. This arrangement of gearing is fully shown in Fig. 36. Two reciprocating shafts, T', are arranged in these sleeve-shafts T, the office of which is to operate the clamping-arms $t'$, arranged in the forward ends of the shafts T, which are enlarged to receive them, said arms $t'$ being pivoted therein in slots formed for that purpose.

The forward ends of the shafts T' are provided with a wedge-shaped cam, $t^2$, which operates between the rear ends of the two clamping-arms $t$, its forward motion, caused by the advance of the shafts T' between them, causing their rear ends to spread outwardly, while their forward ends close down upon the screw-blank presented to them, seizing it on the conical head. (See Fig. 33.) The rear ends of these clamping-arms $t'$ are provided with an auxiliary piece and an adjusting-screw, so that the extent of their play, when acted on by the wedge $t^2$, can be increased or diminished without changing the cam.

Centrally in the head of the shaft T, and between that portion in which the arms $t'$ are pivoted, is formed a deep seat, in which is inserted a pin, $t^3$, a spiral spring also being arranged in the seat below the base of the pin, for the purpose of exerting a continuous outward pressure upon said pin, the pin being retained in its place by means of an elongated slot in its body, through which a small cross-pin passes, and is secured in the shaft T. The pin is thus allowed to reciprocate a certain distance in its seat, and plays between the forward ends of the clamping-arms $t'$, it being forced back by the entry of the screw-blank prior to the blank being clasped by said arms. Its office is to eject the screw-blank after the thread is cut, when it is released from the clasp of the arms $t'$. The opening of the arms $t'$ after the wedge $t^2$ is withdrawn is caused by the action of two spiral springs, $s^{35}$, (see Fig. 33,) arranged in seats in the heads of the shafts T.

The reciprocating shafts T' receive their motion as follows: They are, at their rear ends, as shown in Fig. 29, provided with a head, $T^2$, having an annular slot or groove, $s^{20}$, into which is entered a forked arm, $s^{21}$, projecting from a sliding arm, $s^{22}$, arranged in a slot in a stand, $s^{23}$, attached to the bed A of the machine, the rear end of the arm $s^{22}$ being provided with a pin, which enters a slot in the cams 18 on the auxiliary shaft S, and is operated thereby.

Upon each of the shafts T, and in between the stands $S^4$ and $S^5$, are mounted cams $T^4$ and a sleeve, $T^5$, which has a screw-thread cut upon its periphery, arranged for the purposes which will presently be fully explained.

V are two reciprocating shafts mounted in bearings in the stands $S^3$ and $S^4$. Upon the forward ends thereof are attached the heads V', which carry the cutters $v$, which cut the threads upon the screw-blanks 50. (See Figs. 29 and 30.) The arrangement of the heads, the insertion therein of the cutters, the shape of the cutters, and the mode of adjusting and fastening them may be of any of the well-known and approved forms now used for such purposes.

Upon the shafts V are arranged arms $V^2$, the base or rear of which encircles the shafts V and plays thereon, the extent of such play being limited and controlled by means of a short slot, $v^2$, (see Fig. 29,) formed in the base of the arms $V^2$, a pin, $v'$, passing through the body of the shaft V, entering the slot $v^2$ and a corresponding slot on the opposite side.

This arrangement permits the shaft to rotate a distance equal to the length of the slot $v^2$ without interfering with the arms $V^2$. The forward ends of the arms $V^2$ rest upon the screw-thread $T^5$ on shaft T, and its lower face is provided with creases corresponding with the screw-thread $T^5$ upon the rotating shaft T.

$V^3$ are stands attached to the bed $S^2$, and arranged immediately in the rear of the screw-threaded sleeve $T^5$. To the face of these stands, near the top, is attached a guiding-piece, $v^4$, (see Figs. 31 and 32,) under which the forward ends of the arms $V^2$ slide. This serves to confine the arm $V^2$ down upon the screw-thread on the sleeve $T^5$ and to insure its being operated thereby, as will be explained.

The guiding-piece $v^4$ is readily removed, and is also adjustable in its seat, which is a dovetailed groove in the face of the stand $V^3$, the guide $v^4$ being retained, when once properly set into position, by means of screws inserted from the rear face of the stand $V^3$. The office of this guide $v^4$ will be fully explained at the proper time.

A spiral spring, $V^5$, of considerable power, encircles the shafts V, resting between the rear face of stand $S^3$ and a collar, $V^6$, pinned to the shafts immediately in front of the arm $V^2$, the office of which will also presently be fully explained. An adjustable guide-arm, $v^6$, is, at its forward end, pivoted to the apex of the stand $V^3$. It is raised and lowered by means of a short connecting-arm extending from it to the lever $v^7$, this lever being operated by means of the cam 19 on the auxiliary shaft S, the purposes of which will also be more fully explained hereinafter.

The cam $T^4$ is provided in its face with an annular slot, $v^{10}$, a portion of the cam being cut away, as shown in Figs. 31 and 32, that portion cut away leaving an inclined face, $v^{11}$, which retires until it unites with the slot $v^{10}$. The arm $V^2$ has projecting from its side, at the forward end, toward the cam $T^4$, a pin, $v^8$, which will at the proper time enter the opening in the cam and follow the incline $v^{11}$ until it reaches the slot $v^{10}$, where it remains until the arm has been moved forward to withdraw it, as will be fully explained hereinafter.

The operation of the parts of the apparatus thus far described is as follows: The screw-blank 50 being held in the grasp of the arm $t'$ on the end of shafts T, as shown in dotted lines in Fig. 29, the said shafts, by means of the gearing previously described, are made to revolve to the left, the end of arm $V^2$ resting upon the screw-thread $T^5$ on shaft T, as shown in Fig. 29, and under the guide $v^4$. The action of the screw-thread upon the arm $V^2$ causes it to move forward until it clears the end of the guide-piece $v^4$, and it will be seen that this movement of the arm $V^2$ causes the reciprocating shaft V to advance in unison therewith, carrying the cutters $v$, mounted in the clutch at its forward end, a distance equal to the length of the guide $v^4$, this movement of the shaft V, of course, compressing the spiral spring $V^5$ between the collar $V^6$ and the stand $S^3$ when the arm $V^2$ passes beyond the end of the guide $v^4$, the action of the spring $V^5$ causing it to rotate sufficiently to lift the arm $V^2$ from the screw-thread $T^5$ past the end of the guide $v^4$ until the forward end of the arm strikes under the movable guide $v^6$, (see Fig. 32,) which prevents its further use. At this point the guide is lowered to the position as shown best in Fig. 32. The action of the compressed spring $V^5$, as soon as the arm $V^2$ clears the guide $v^4$, drives the shaft V back to the rear, carrying arm $V^2$ with it, the movable guide $v^6$ so directing the arm $V^2$ that its pin $v^8$ necessarily enters the opening $v^{11}$ in the cam $T^4$, which, as it revolves, catches the pin on the inclined face of the recess, thereby forcing the pin down into the slot $v^{10}$. This brings the arm $V^2$ down upon the screw-thread $T^5$, which at once acts thereupon and causes it to again advance, the pin $v^8$ retaining its position in the slot $v^{10}$ in the cam $T^4$ until the end of the arm $V^2$ has passed under the guide $v^4$. At this juncture, or as soon as the pin has entered the slot in the cam, the movable guide $v^6$ is lifted into its first position.

It will thus be seen that the extent of the forward movement of the shaft V, carrying the cutters $v$, is controlled and adjusted by the simple changing of the guides $v^4$ to meet the circumstances, it being replaced by a short guide if a short screw-blank is being cut, and by a longer one in case a long screw is to be threaded; in other words, the length of the guide $v^4$ corresponds with the length of the thread to be cut.

The arrangement of the various operating parts of this portion of the apparatus is such that the movement of the cutters $v$ upon the screw-blank is repeated six times, this number of cuts being sufficient to finish the thread to the desired depth and shape.

That part of the apparatus arranged and applied to govern the movement of the cutting-tools $v$ so that the thread is made tapering, and to terminate in what is known as the "gimlet-point," is plainly illustrated in Figs. 2, 29, and 30, to which the following description refers:

W is a frame attached to legs $w$, which are bolted to the bed $S^2$, the whole overreaching the thread-cutting apparatus, as shown plainly in Fig. 30. On its front face this frame is provided with a T-groove, $w'$, formed in the rear of caps $w^3$. In this slot are inserted two reciprocating slides, $w^2$, which are readily removed at will by detaching the caps $w^3$, which are fastened by screws to the face of the frame W. A pin, $w^4$, is inserted in the slides $w^2$, and projects therefrom to the rear through a slot, $w^5$, cut through the body of the frame W, such pin and slot being indicated in Fig. 30 by dotted lines.

An arm, $W'$, projects upwardly from the right-hand end of the frame W, into which is entered and bolted a projecting stud-pin, $W^2$, upon which are hung two swinging levers, $W^3$. These levers are provided with an adjusting-slot, $w^6$, in which is inserted a slide, $w^7$, a short arm, $w^8$, projecting therefrom to the rear of the levers $W^3$, an adjusting screw-bolt, $w^9$, attached to the apex of the levers $W^3$, passing through it, (see Fig. 30,) for the purpose of raising and lowering the slides $w^7$ in the slots $w^6$, and securing them in any desired position.

A pin, $W^{11}$, projects from the slides $w^7$, and the connecting-levers $W^4$ are attached thereto, the forward ends of such levers being attached to the pins $w^4$, which project to the rear from the two slides $w^2$. It will be seen that the play of these levers is governed by the adjustable slides $w^7$ in the swinging arms $W^3$, the raising or lowering of which changes the length of the throw. It will also be seen that the swinging of the arm $W^3$ will, through the medium of the levers $W^4$, reciprocate the slides $w^2$.

$W^5$ is a small stand attached to the bed A of the machine, having two arms, $w^{13}$, in which is arranged a shaft, $w^{14}$, on which is mounted a cam, $w^{15}$, a similar cam, $w^{16}$, being mounted on a sleeve which encircles and rotates on the shaft $w^{14}$. The shaft $w^{14}$ is rotated by means of a ratchet-wheel, $w^{17}$, attached thereto, this ratchet, in turn, being operated by means of a pawl, $w^{18}$, attached to the end of a lever, $W^6$, such lever being pivoted in a stand attached to the bed A of the machine, and operated by means of a cam, 20, on the auxiliary shaft $S'$, the cam $w^{16}$ also being operated by a like arrangement of parts. The rising of the forward end of the levers $W^6$ moving the ratchet-cams one step, the lever is then instantly depressed, and the movement repeated. Thus a step-by-step motion is imparted to the cams $w^{15}$ and $w^{16}$, which thereby gradually push the arms $W^3$ forward, causing the slides $w^2$ to advance with the same gradual movement.

To the face of the slides $w^2$ on the front face of the frame W are attached projecting arms $W^8$, (see Figs. 29 and 38,) on the lower faces of which are formed the guiding-cams $w^{20}$. These guide-cams are slotted, as at $w^{21}$, Fig. 38, through which slots are entered set-screws, so that the position of the cams can be adjusted to the right or left, as may be desired.

Other guide-cams of different lengths and shape can readily be attached, as these cams will necessarily vary according to the length of the screw-blank that is being threaded. The shape of these cams $w^{20}$ is shown plainly in Fig. 29, their outer ends being curved, so as to guide the cutters $v$ to a point at the close of their forward movement in the process of thread-cutting, while there is a gradual taper the whole length of the cam, the form of which is necessarily reproduced upon the screw-blank by the cutters.

$W^{10}$ are upright arms firmly secured upon the shaft V, and at their apices rest against the face of the guide-cams $w^{20}$. (See Fig. 30.) They are for the purpose of gradually rotating the shaft a certain distance in order to depress the cutters $v$, mounted thereon, to their work, according to the shape of the guide-cams $w^{20}$, the form of which the tops of the arms $W^{10}$ follow. This results in gradually tapering the blank as it is cut, and finishing it with a gimlet-point, the gradual movement forward after each cut for six repeated cuts by the advancing of the slides $w^2$, of course, resulting in depressing the cutters $v$ at each cut, so that the depth of the cut is controlled and adjusted to suit circumstances, as may be desired.

The operation of this portion of the apparatus is as follows: The cutters being controlled by the arrangement of parts first described, acting upon the shafts V as the advance thereof takes place, the guide-arms $W^{10}$ follow against the face of the guide-cam $w^{20}$, the cutters $v$ making the first cut upon the screw-blank, which is rotated against the cutter by the action of the shaft T. As the first cut is finished the cutter is retracted quickly to its first position by the action of the springs $V^5$ on the shafts V and arms $V^2$, preparatory to making the second cut. At this juncture the slides $w^2$ are advanced a short distance, moving the guide-cams $w^{20}$ forward the same distance, which, in turn, act upon the arms $W^{10}$, which rotate the shaft V slightly, depressing the cutters $v$ for the second cut, which is then accomplished in the same manner as in the case of the first cut. These cutting operations are now repeated until six successive cuts have been made, each cut being deeper than the one preceding it. These motions for advancing the cutters $v$ are gradual until the six steps on the ratchet-wheel $w^{17}$ have been traversed, when the shape of the cam $w^{15}$ permits the swinging levers $W^3$ to retire to their first position, this being accomplished by means of the pressure of the springs $V^5$ forcing back the arms $W^{10}$ against the guide-cams $w^{20}$, forcing slides $w^2$ to retire, the levers $w^4$ and the arms $W^3$ likewise giving way to the pressure.

It will thus be understood that any desired length of screw-thread may be cut upon the blank, and of any desired taper, and that any depth of cut can be obtained through the various adjustable devices, as described.

The position of the transferring apparatus in relation to the screw-threading apparatus is shown best in Figs. 2, 33, and 34. In Fig. 33 it is shown with a screw-blank, 50, in the seats $m^3$, preparatory to its delivery to the clutch on the end of the shaft T.

$y$ represents a guiding-stand, which is formed in two sections. These sections are arranged to slide in grooves in the stand $y'$, attached to the bed A of the machine. The two sections of the guide-stand $y$ are opened and closed by means of sliding levers $y^2 y^3$, arranged in guides on the bed of the machine and reciprocated by the action of the cams 21 on the auxiliary shaft S'. The apices of these two sections of the stand $y$, at the point where they meet, are provided with a groove or recess conforming to the shape of the screw-blank. When closed they partially encircle the screw-blank and form a steadying-guide and rest during the operation of thread-cutting. Their apices do not wholly close over the blank, but leave an opening for the projection therefrom of that part of the blank upon which the cutters $v$ touch and operate.

$y^5$ and $y^6$ are fingers arranged in the rear of the transferring apparatus to force the blanks 50 therein into and beyond the recess in the top of the stand $y$, and thence into the grasp of clamping-arms $t'$ on the end of shaft T. These fingers are mounted in a carriage, $y^7$, arranged to reciprocate in grooves or ways formed in the top of a bifurcated stand, $y^8$, bolted to the bed A of the machine. The carriages $y^7$ are reciprocated in the grooved ways in the stand $y^8$ by means of oscillating levers $y^9$, pivoted on a stud, $y^{10}$, bolted to the bed A of the machine, the forward end of these levers being slotted or forked, which encircles the pins $y^{11}$, which depend (see Figs. 33 and 34) from the sliding carriages $y^7$, the rear end of the levers being provided with a pin which enters the groove in the cams 22 on auxiliary shaft S', by means of which the desired movements are given to the pins $y^{11}$ and carriages $y^7$ at the proper time.

The transferring apparatus, which has hereinbefore been fully described, carries the blanks which have been previously headed, shaved, drilled, punched, slotted, and reshaved from the last-named operation (reshaving) to the seat $m^3$, whose position is directly opposite the finger $y^6$ and the first clutch $t'$ on the end of the shaft T of the first threading device. It is there released from the grasp of the transferring-jaws, and rests in the seats $m^3$ in the frames of the transferrer. The finger $y^6$ then advances, pushing the blank out of the seats $m^3$ into the recesses in the apex of the sectional stand $y$, (the sections of which are now open far enough to permit the passage of the conical head of the blank,) wherein it is guided until the head is projected therefrom and enters in between the clutching-arms $t'$ of the head on the end of the shaft T. As the blank strikes against the pin $t^3$ it forces it down against the spring in its seat in shaft T. The arms $t'$ then close down upon the blank, and hold it rigidly and immovably. The sectional stand $y$ then closes upon the blank, and it is then in position for the cutting of the thread thereupon. The cutters $v$ are then moved forward and down, in the manner as previously described, cutting the thread. This done, the sectional stand opens, the clamps $t'$ release their hold upon the blank, it being ejected therefrom by the pressure of the pin $t^3$, and drops down through the base of the sectional stand $y$, and through an opening in the bed A of the machine, into any proper receptacle provided to receive it.

After the transferrer has delivered the first blank to the first thread-cutting device, and while that blank is being threaded, the next blank following is passed to the intermediate seat, $m^3$, located in between the two thread-cutters, and thence to the seat opposite the second thread-cutter, where it at once is treated as in the case of the first blank, a third blank in the meantime having been delivered into the intermediate seat, and a fourth blank to the seat opposite the first cutter. It will thus be seen that the two cutters receive and act upon the alternate blanks, both being operated upon at the same time, in the manner as indicated.

This screw-threading apparatus may be detached from the rest of the combined machine and used as a separate machine, the screw-blanks, in such a case, being fed from the hopper to the transferring apparatus, which then becomes a conveying device, its operation, however, being exactly the same as has been described.

Having thus fully described my invention in every phase of its varied applications and operations, what I claim as new, and desire to secure by Letters Patent of the United States, is—

1. In an organized machine arranged for the automatic manufacture of screws from a continuous supply of wire, the combination of the following elements, viz: a blank-heading device, a shaving device, a drilling device, a punching device, a slotting device, a reshaving device, a screw-threading device, an apparatus for transferring the screw-blanks from one device to the others, and suitable mechanism for operating such series of devices, such combination of instrumentalities being arranged for the manufacture of screws the heads of which are provided with an angular cavity in addition to the usual slot or nick.

2. In an organized machine arranged for the automatic manufacture of screws from a continuous supply of headed blanks, the combination of the following elements, viz: a shaving device, a drilling device, a punching device, a slotting device, a reshaving device, a screw-threading device, an apparatus for transferring the blanks from the first-named device to the others in succession, and suitable mechanism for operating such devices, such combination of instrumentalities being arranged for the manufacture of screws the heads of which are provided with an angular cavity in addition to the usual slot or nick.

3. In an organized machine arranged for the automatic manufacture of screws from a continuous supply of wire, the combination of the following elements, viz: a blank-heading device, a drilling device, a punching device, a slotting device, a shaving and milling device, a screw-threading device, an apparatus for transferring the screw-blanks from one device to the others, and suitable mechanism for operating such devices, such combination of instrumentalities being arranged for the manufacture of screws the heads of which are provided with an angular cavity in addition to the usual slot or nick.

4. In an organized machine arranged for the automatic manufacture of screws from a continuous supply of headed screw-blanks, the combination of the following elements, viz: a drilling device, a punching device, a slotting device, a shaving and milling device, a screw-threading device, an apparatus for transferring the screw-blanks from the first-named device to the others, and suitable mechanism for operating such devices, such combination of instrumentalities being arranged for the manufacture of screws the heads of which are provided with an angular cavity in addition to the usual slot or nick.

5. In an organized machine arranged for the automatic manufacture of screws from a continuous supply of wire, the combination of the following elements, viz: a blank-heading device, a shaving device, a drilling device, a punching device, a screw-threading device, an apparatus for transferring the screw-blanks from one device to the others, and suitable mechanism for operating such devices, such combination of instrumentalities being adapted to the manufacture of screws the heads of which are provided with an angular cavity in place of the usual slot or nick.

6. In an organized machine arranged for the automatic manufacture of screws from a continuous supply of headed screw-blanks, the combination of the following elements, viz: a shaving device, a drilling device, a punching device, a screw-threading device, an apparatus for transferring the screw-blanks from the first-named device to the others in succession, and suitable mechanism for operating such devices, such combination of elements being adapted to the manufacture of screws the heads of which are provided in the center with an angular cavity in place of the usual slot or nick.

7. In an organized machine arranged for the automatic manufacture of screws from a continuous supply of wire, the combination of the following elements, viz: a blank-heading device, a drilling device, a punching device, a combined milling and shaving device, a screw-threading device, an apparatus for transferring the screw-blanks from one device to the others, and suitable mechanism for operating such devices, such combination of elements being arranged for the manufacture of screws the heads of which are provided in the center with an angular cavity in place of the usual slot.

8. In an organized machine arranged for the automatic manufacture of screws from a continuous supply of headed screw-blanks, the combination of the following elements, viz: a drilling device, a punching device, a combined milling and shaving device, a screw-threading device, an apparatus arranged for transferring the screw-blanks from the first-named device to the others in succession, and suitable mechanism for operating such devices, such combination of instrumentalities being arranged for the manufacture of screws which are provided in the center of their heads with an angular cavity in place of the usual slot or nick.

9. In an organized machine arranged for the automatic manufacture of screws from a continuous supply of wire, the combination of the following elements, viz: a blank-heading device, a shaving device, a drilling device, a slotting device, a reshaving device, a screw-threading device, and apparatus for transferring the screw-blanks from one device to the others, and suitable mechanism for operating such devices, such combination of instrumentalities being arranged for the manufacture of screws the heads of which are provided centrally with a round hole in addition to the usual slot or nick.

10. In an organized machine arranged for the automatic manufacture of screws from a continuous supply of headed screw-blanks, the combination of the following elements, viz: a shaving device, a drilling device, a slotting device, a screw-threading device, an apparatus for transferring the screw-blanks from one device to the others in succession, and suitable mechanism for operating such devices, such combination of instrumentalities being arranged for the manufacture of screws the heads of which are provided centrally with a round hole in addition to the usual slot or nick.

11. In an organized machine arranged for the manufacture of screws provided in the center of their heads with a round or angular cavity in addition to or without the usual slot or nick, the combination of the following devices, viz: a rotating spindle provided with clamping-jaws for grasping the screw-blank, a longitudinally-reciprocating rotating spindle carrying a drill, the two spindles revolving in contrary directions, a feeding device for delivering the screw-blanks thereto, and suitable mechanism for operating such devices, the whole arranged and operating substantially as herein shown and set forth.

12. In an organized machine arranged for the manufacture of wood-screws provided in the center of their heads with a round or angular cavity in addition to or without the usual slot or nick, the combination of the following devices, viz: a rotating spindle provided with clamping-jaws for grasping the screw-blank, a longitudinally-reciprocating rotating spindle carrying a drill, the two spindles rotating in contrary directions, a shaving cutter or cutters, a feeding device for delivering the screw-blanks to such devices, and suitable mechanism for operating such instrumentalities, all arranged and operating substantially as herein shown and set forth.

13. In an organized machine arranged for the manufacture of wood-screws, in combination with the shaving, slotting, and screw-threading devices embodied therein, and a series of power-presses provided with dies for grasping the screw-blanks while being operated upon by such devices, a transferring apparatus provided with a series of clamping-jaws operating in a frame provided on its apex with a series of transfer-seats, such jaws arranged to automatically adjust their grasp to various gages of wire and having the following-stated movements: a movement to the right and an upward movement to grasp and remove the series of screw-blanks from the various devices operating thereon, and a movement to the left and a downward movement to deliver such blanks to the next succeeding operation, the whole arranged, applied, and operating substantially in the manner as herein shown and set forth.

14. The combination of an apparatus or device for punching an angular cavity in the head of a screw-blank previously drilled, a device for slotting or nicking the same, and a transferring apparatus for delivering the screw-blanks to and removing them from such punching and slotting devices, the whole arranged and operating substantially as herein shown and set forth.

15. The combination of a reshaving apparatus, consisting of a reciprocating rotating shaft carrying a milling and shaving tool, such shaving-tool being adjusted to its work by the advance of such shaft and retired therefrom by its retrograde movement, a device for clamping and holding the screw-blank while it is being operated upon, and the apparatus for delivering the screw-blanks to and removing them from the action of the milling and shaving apparatus, the whole arranged, applied, and operating substantially as and for the purposes as herein shown and set forth.

16. The combination of a carrying-trough arranged to convey a column of screw-blanks from a heading apparatus or a hopper, a device for separating or selecting a single blank from the column of blanks so conveyed, a device for shaving the heads of such blanks, a drilling apparatus, a stationary guide-rest, a reciprocating guide-rest, and an apparatus for transferring the blanks (after drilling and shaving) therefrom to the succeeding operations in the formation of a screw, all substantially as herein shown and set forth.

17. The combination of a carrying-trough arranged to convey a column of screw-blanks from a heading apparatus or a hopper, a device for separating or selecting a single blank from the column of blanks so conveyed, a device for shaving the heads of such blanks, a stationary guide-rest, a reciprocating guide-rest, and an apparatus for transferring the blanks (after being shaved) therefrom to the succeeding operations in the formation of a screw, all substantially as herein shown and set forth.

18. The combination of a screw-threading apparatus having two sets of threading devices operating in unison, an apparatus for delivering the screw-blanks alternately to such screw-threading devices, two sectional guide-stands arranged to receive the screw-blanks from such delivering apparatus, and to guide them to the revolving clamps which grasp the heads of the blanks and rotate them during the process of thread-cutting, said guide-stands retaining and guiding the blanks while the thread-cutters operate thereupon, and afterward opening laterally and delivering the finished screws through their base, and two reciprocating fingers arranged to force the blanks from the delivering apparatus to said sectional guide-stands and revolving clamps, all substantially as herein shown and set forth.

19. The reciprocating guide-rest $i'$ and fixed guide-rest $i$, arranged to support the screw-blanks prior to and during the process of drilling and shaving, and for delivery to the transferring apparatus, substantially as herein shown and set forth.

In testimony whereof I have hereunto set my hand this 26th day of September, A. D. 1878.

JOSEPH H. GREENLEAF.

Witnesses:
A. L. MUNSON,
H. S. SANFORD.